(12) United States Patent
Taylor et al.

(10) Patent No.: US 7,158,097 B2
(45) Date of Patent: Jan. 2, 2007

(54) GAZE TRACKING SYSTEM

(75) Inventors: Richard Ian Taylor, Bracknell (GB);
Simon Michael Rowe, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 10/681,230

(22) Filed: Oct. 9, 2003

(65) Prior Publication Data

US 2004/0075645 A1    Apr. 22, 2004

(30) Foreign Application Priority Data

Oct. 9, 2002  (GB) ............................ 0223490.4
Oct. 11, 2002 (GB) ............................ 0223759.2

(51) Int. Cl.
*G09G 5/00* (2006.01)
(52) U.S. Cl. .......................... 345/8; 345/156
(58) Field of Classification Search ............ 345/7, 345/8, 9, 156
See application file for complete search history.

(56) References Cited

U.S. PATENT DOCUMENTS

| 4,384,336 A | 5/1983 | Frankle et al. ............ 382/49 |
| 6,243,076 B1 | 6/2001 | Hatfield .................... 345/156 |
| 2001/0031073 A1 | 10/2001 | Tajima .................... 382/118 |
| 2004/0196433 A1* | 10/2004 | Durnell .................... 351/209 |

FOREIGN PATENT DOCUMENTS

| EP | 1 255 225 A3 | 3/2004 |
| GB | 2 351 216 A | 12/2000 |
| WO | WO 86/01963 | 3/1986 |
| WO | WO 02/09024 A1 | 1/2002 |
| WO | WO 03/017203 A1 | 2/2003 |

OTHER PUBLICATIONS

M.S. Bartlett, "Learning Viewpoint Invariant Representations Of Faces In An Attractor Network," Face Image Analysis By Unsupervised Learning, Chapter 7, pp. 129-149, Kluwer Academic Publishers (2001), ISBN 0-7923-7348-0.
T.F. Cootes, et al., "Locating Faces Using Statistical Feature Detectors," Proceedings of the Second International Conference on Automatic Face and Gesture Recognition (Oct. 14-16, 1996), pp. 204-209, Killington, Vermont, USA.
T. Kohinen, "The Original Incremental SOM Algorithm," Self-Organizing Maps, Third Edition (1999), Section 3.2, pp. 109-116, Springer, New York, USA, ISBN 3-540-67921-9.

(Continued)

*Primary Examiner*—Richard Hjerpe
*Assistant Examiner*—Jean Lesperance
(74) *Attorney, Agent, or Firm*—Fitzpatrick, Cella, Harper & Scinto

(57) ABSTRACT

A gaze tracking system (1,3,8) is provided which obtains images of an operator (9) and processes the images to associate the images with coordinates of where the operators gaze is directed towards.

In order to identify images where an operator is looking in the same direction, images obtained by a camera (8) are first processed using the retinex algorithm. Image patches from the processed image are then compared with stored feature images and an initial classification based upon the correspondence between areas of the processed image and the stored feature images is determined. This initial classification is then further processed and each image is assigned a single classification. The areas identified by different classifications are then determined so that classifications assigned to adjacent images identify points closer together and classifications never assigned to an adjacent images identify points further apart.

39 Claims, 14 Drawing Sheets

OTHER PUBLICATIONS

E.H. Land, et al., *"Lightness and Retinex Theory,"* Journal of the Optical Society of America (Jan. 1971), vol. 61, No. 1, pp. 1-11.

J. McCann, *"Lessons Learned From Mondrians Applied To Real Images And Color Gamuts,"* Imaging Science and Technology Reporter (1999), vol. 14, No. 6 (1999).

T. Sabisch, et al., *"Identification Of Complex Shapes Using A Self-Organizing Neural System,"* IEEE Transactions on Neural Networks, vol. 11, No. 4, pp. 921-933 (Jul. 2000), ISBN 1045-9227.

* cited by examiner

GAZE TRACKING SYSTEM

The present application relates to gaze tracking using computer processing of image data.

There are many applications which require information about where an operator is looking at. Two examples are utilising the determination of gaze of an operator to effect cursor control or icon selection.

In a further example, if the orientation and direction of an operators head can be determined, data representing this orientation and direction can be transmitted and used to animate a virtual representation of that operator. The virtual representation of the operator can then be shown to interact with other virtual representations with the representation of the operator being made to look at appropriate portions of the other virtual representations. In this way the interaction of groups of people may be more accurately represented.

An example of a system in which an operator's gaze is tracked and used to animate virtual representations of an operator is described in GB-A-2351216. In GB-A-2351216 the gaze of an operator is tracked through the use of markers placed on the operators head. With the markers in place, images of the operator are then recorded. These images are then processed to identify the relative positions of the markers in each image. These relative positions are then used to calculate the orientation of the operator's head and hence the location of the operator's gaze which is used to determine how a virtual representation of the operator is animated and interacts with other virtual representations. Although, using markers simplifies the tracking of gaze, requiring an operator to place markers on their head is undesirable.

An alternative image processing system which avoids the need for such markers is therefore required. In such a system, it is desirable that the tracking system can be used in circumstances where the operating environment does not have to be strictly controlled. That is to say the tracking system does not require lighting levels to remain substantially fixed and the tracking system does not overly limit the allowed movement of an operator whose gaze is being tracked. It is also desirable that the system is able to track the gaze of a variety of users and that the tracking of gaze can be achieved without excessive demands for training data.

In accordance with one aspect of the present invention there is provided an apparatus for associating gaze data representative of the location of gaze of an operator with classifications of images of an operator looking at different locations, comprising:
means for receiving a sequence of images representative of an operator at different points in time;
means for assigning one of a number of classifications to images in a received sequence of images such that the same classifications are assigned to images of an operator looking at the same locations;
a classification store configured to store data identifying the pairs of different classifications assigned to pairs of images in said received sequence representative of an operator at different times separated by less than a preset time period;
a gaze conversion store configured to store data associating each of said number of classifications with gaze data representative of a gaze location; and
an update unit operable to updated stored gaze data such that gaze data for pairs of different classifications identified by data stored in said classification store identify gaze locations which are closer together and gaze data for pairs of different classifications not identified by data stored in said classification store identify gaze locations which are further apart.

In accordance with a further aspect of the present invention there is provided a method associating gaze data representative of the location of gaze of an operator with classifications of images of an operator looking at different locations, comprising the steps of:
receiving a sequence of images representative of an operator at different points in time;
assigning one of a number of classifications to images in the received sequence, wherein the same classifications are assigned to images of an operator looking at the same locations;
storing data identifying the pairs of different classifications assigned to pairs of images in the received sequence representative of an operator at different times separated by less than a preset time period;
storing data associating each of said number of classifications with gaze data representative of a gaze location; and
updating stored gaze data by updating said gaze data such that gaze data for pairs of different classifications identified by stored data said gaze data identifies gaze locations which are closer together and gaze data for pairs of different classifications not identified by stored data are updated to identify gaze locations which are further apart.

Embodiments and applications of the present invention will now be described, by way of example only, with reference to the accompanying drawings, in which:

FIGS. 10A, 10B, 10C and 10D are schematic illustrations for explaining the relative ordering of points using data identifying adjacent points;

FIRST EMBODIMENT

Figure 1:
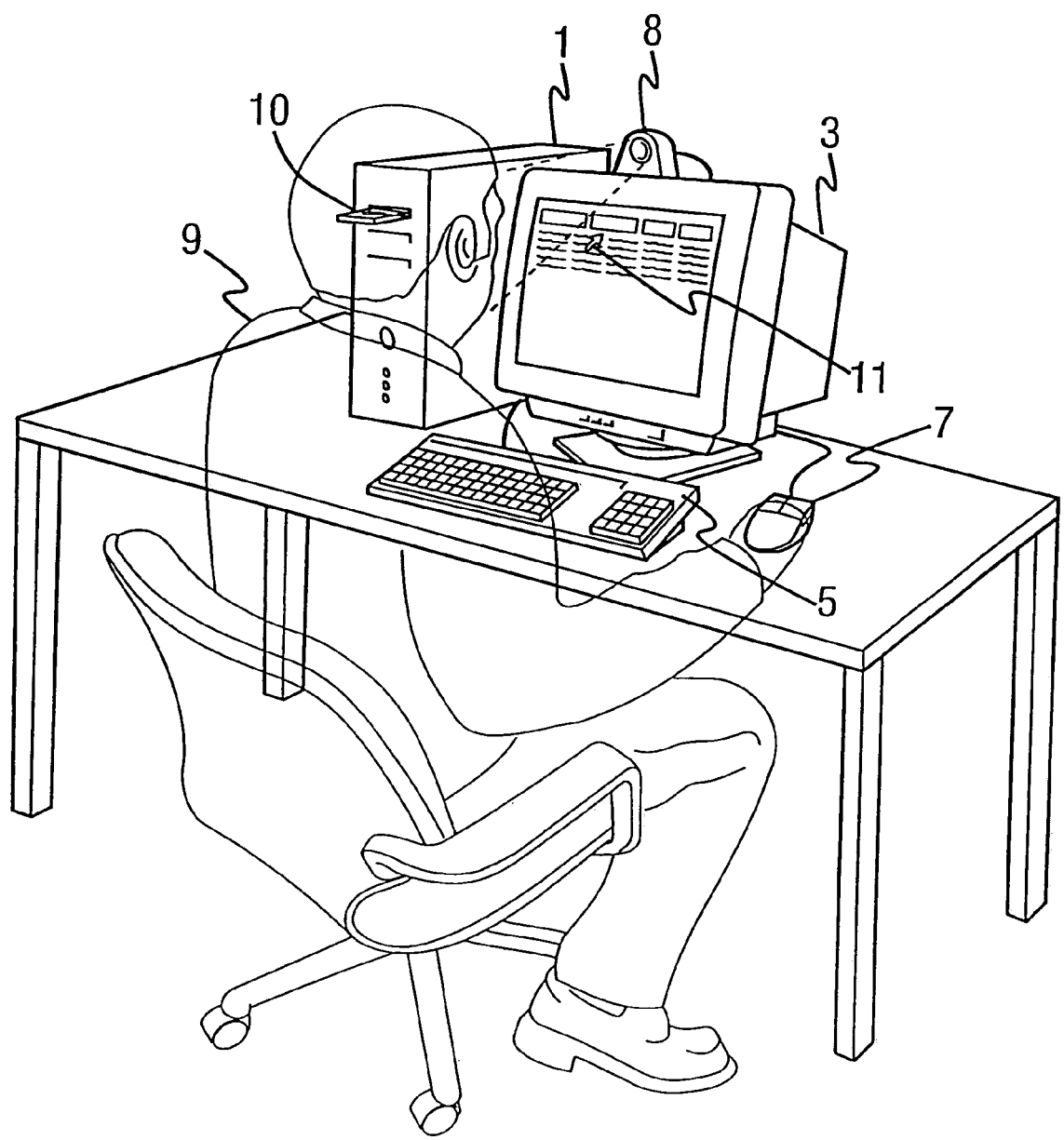
FIG. 1 is a schematic perspective view of a user operating a computer system incorporating a gaze tracking system embodying the present invention.

Referring to FIG. 1, a computer 1 is provided which is connected to a display 3, a keyboard 5 and a mouse 7. Also connected to the computer 1 is a camera 8 that is oriented to obtain images of an operator 9 inputting data into the computer using the mouse 7 and the keyboard 5.

The computer 1 is programmed to operate in accordance with programming instructions input for example as data stored on a storage medium such as a disc 10 or down loaded as a signal from a network such as the Internet. As will be described in more detail below, the programming instructions comprise instructions to cause the computer 1 to be configured to process image frames obtained via the camera 8 showing the operator 9 to associate the image frames with estimated gaze coordinates of the location at which the operator 9 was looking when the images were recorded by the camera 8. These calculated co-ordinates can then be utilised by an application program to, for example, animate a virtual representation of the operator 9.

As will be described in detail later, the processing of the computer 1 associates image frames with estimated gaze co-ordinates primarily on the basis of the content of the recorded images and the relative timing at which the images were recorded. Occasionally, images of the operator 9 will be obtained when the operator 9 uses a pointer 11 under the control of the mouse 7 to select a specific portion of the display 3. In this embodiment, gaze co-ordinates generated by the computer 1 are further refined using data identifying such operator-selected portions of the display 3 when this is available.

System Overview

Figure 2:
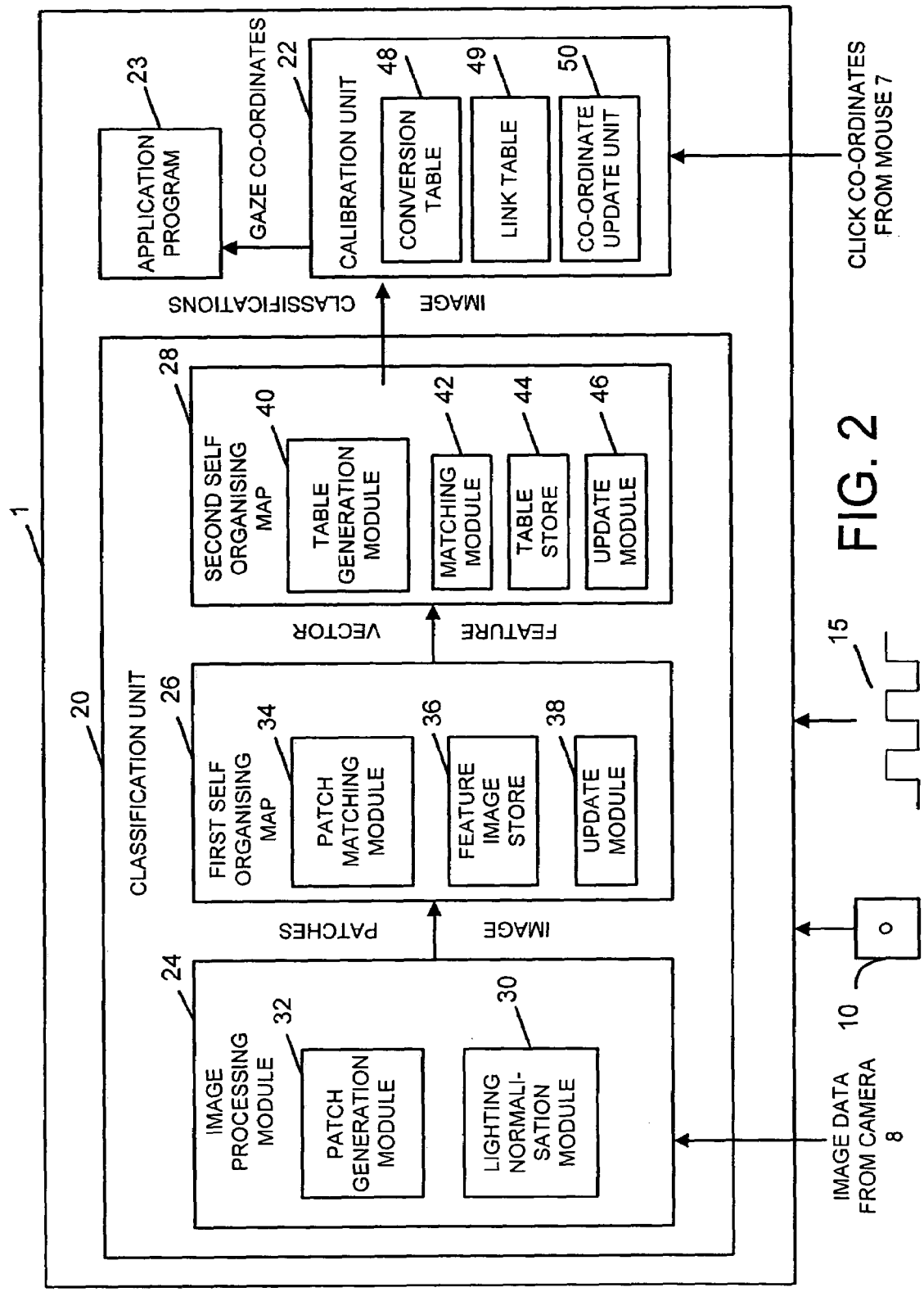
FIG. 2 is a schematic block diagram of the functional components of the computer system of FIG. 1.

Referring to FIG. 2, when programmed by the programming instructions by being read from a disk 10 or by being downloaded as signal 15 over a network or the Internet, the computer 1 effectively becomes configured into a number of functional units for performing processing operations. Examples of such functional units and their interconnections are shown in FIG. 2. The units and the interconnections illustrated in FIG. 2 are, however, notional and are shown for illustrative purposes only to assist understanding; they do not necessarily represent the exact units and connections into which the processors, memory etc. of the computer 1 become configured.

Referring to the functional units shown in FIG. 2, in this embodiment, the programing instructions cause the computer to be configured into three main functional units: a classification unit 20, a calibration unit 22 and an application program 23.

The classification unit 20 receives a stream of camera images from the camera 8, each of which comprises, in this embodiment, 176 by 144 pixels. Each image is processed in turn by the classification unit 20 and assigned a classification number. As soon as an image has been processed its classification number is passed to the calibration unit 22. Once a classification number has been passed to the calibration unit 22, the classification unit 20 then proceeds to process the next image in the stream of images received from the camera 8. Meanwhile, the calibration unit 22 utilises the received classification number to generate gaze coordinates indicative of a gaze location. When gaze coordinates have been determined by the calibration unit 22, these are passed on to the application program 23. The application program 23 then utilises the gaze co-ordinates whilst the calibration unit 22 proceeds to process the classification number for the next image frame.

The processing of the classification unit 20 is such that, after an initial set up period, images corresponding to a user looking in the same area are assigned the same classification number. This initial set up period does not correspond to the processing of a fixed number of frames. Rather, after processing increasing numbers of frames the classification unit 20, will increasingly assign the same classification numbers to images corresponding to a user looking in the same area. The exact number of images which the classification unit 20 requires to achieve this consistent classification of images will depend upon the content of the images being processed.

In this embodiment, the classification unit 20 is arranged to associate each image with one of fifty different classification numbers. The classification of an image frame by the classification unit 20 therefore identifies that the image frame corresponds to a user looking at one of fifty distinct areas.

As will be described in detail later, the processing of the classification unit 20 is not such that the relative locations of areas represented by the fifty different classifications can be determined in advance. However, after the initial set up period, the calibration unit 22 is able to determine the relative locations represented by the different locations utilising the classification numbers assigned to consecutive images in a stream camera images from the camera 8.

This determination of relative gaze position is achieved because an operator 9 is only able to move his head a certain distance in the time between image frames obtained by the camera 8 (because one frame is recorded by the camera 8 every ¹⁄₂₅th of a second in this embodiment). By ensuring that the classification unit 20 classifies an operators gaze in terms of areas which a users gaze will not cross in ¹⁄₂₅th of a second, the calibration unit 22 is then able to assume that consecutive numbers in the stream of numbers received from the classification unit 20 correspond to a user looking at adjacent areas. As will be described in detail later, by monitoring which numbers correspond to adjacent areas, the calibration unit 22 generates records associating each number output by the classification unit 20 with a gaze position which is correct relative to the positions for the other classification numbers.

In order for the calibration unit 22 to match the numbers received from the classification unit 20 to absolute co-ordinate positions, in this embodiment, the calibration unit 22 is also arranged to monitor the mouse 7 to identify image frames which correspond to points in time when the operator 9 clicks on the mouse 7. In general, when an operator 9 clicks on the mouse 7 the operator 9 will be looking at the point on the screen corresponding to the pointer 11 controlled by the mouse 7. This therefore provides absolute information about the operator's gaze position on the screen at that point in time. The calibration unit 22 then utilises this data to associate absolute positions to the fifty different image classification numbers received from the classification unit 20.

The constitution of classification unit 20 and calibration unit 22 will now each be described.

Classification Unit

In order for the images received from the camera 8 to be processed by the classification unit 20 in a consistent manner, a number of problems must be overcome.

Firstly, received images must be processed by the classification unit 20 in a way which accounts for changes in images which arise due to variation in lighting and the movement of an operator 9 towards and away from the display 3 which do not indicate that the operator 9 is looking at a different part of the screen but which will result in differences in the images recorded by the camera 8.

Further the classification unit 20 must be able to process images received from the camera 8 to identify similar images which correspond to the operator looking at the same part of the display part 3. Information in the form of mouse click data about the actual location of an operator's gaze is only available for relatively few frames. That is to say very few images are directly associated with information relating to an operator's gaze which could be used as training examples to ensure that the classifications of images by the classification unit 20 are accurate. It is therefore important that the classification unit 20 can achieve classification of images utilising all the available images and not just the few images associated with mouse click data.

To this end, in this embodiment, the classification unit 20 comprises an image processing module 24, a first self-organising map 26 and a second self-organising map 28. In this embodiment, the first and second self organising maps 26, 28 comprise unsupervised learning systems of the type described in detail in 'Self Organising Maps', T. Kohonen, $3^{rd}$ Edition Springer, 2001, ISBN 3-540-67921-9 which is hereby incorporated by reference.

An overview of the processing of the image processing module 24 and, the first and second self organising maps 26, 28 of the classification unit 20 will now be described.

a) Image Processing Module

In this embodiment, the image processing module 24 comprises: a lighting normalisation module 30 for substantially removing lighting effects from the images received from the camera 8, and a patch generation module 32 for identifying portions of each image which are likely to indicate changes resulting from the change of gaze of an operator 9 and for outputting image patches based on areas of an image frame corresponding to these portions. The image patches extracted by the image processing module 24 for each image frame are then passed to the first self-organising map 26.

Specifically, and as will be described in detail later, the patch generation module 32 initially compares the value of each pixel in the current image frame from which lighting effects have been removed with the value of the corresponding pixel in the previous image frame from which lighting effects were removed. Where these pixel values differ by more than a predetermined threshold, the patch generation module 32 then proceeds to generate a set of image patches for the pixel using different sized areas of—the image centered on that pixel.

Figure 3:
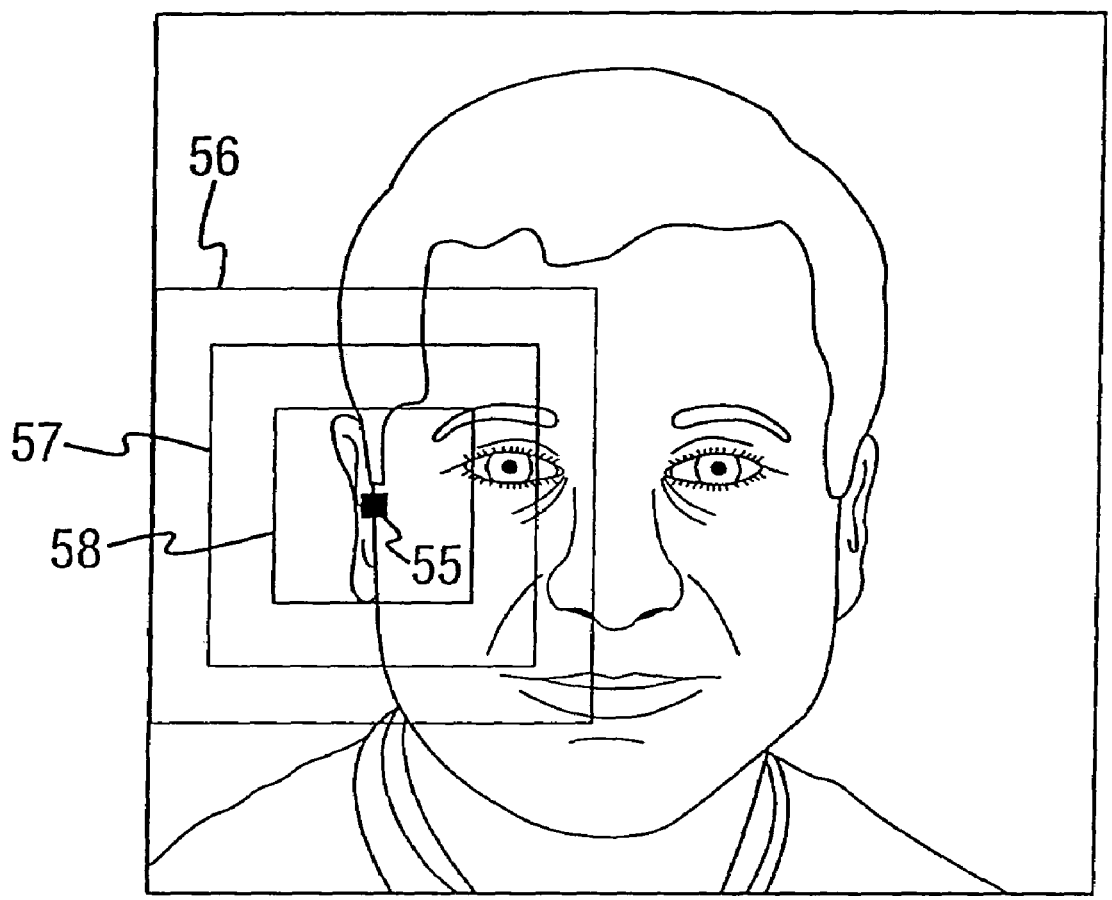
FIG. 3 is an illustration of areas of an image utilised to generate a set of image patches for processing by the classification unit of FIG. 2.

Thus, for example, as is illustrated FIG. 3, after determining that a pixel 55 has varied compared with the corresponding pixel in the previous image frame, the patch generation module 32 proceeds to utilise three differently sized areas 56, 57 and 58 to generate three image patches for subsequent processing. In this embodiment each generated image patch comprises 31 by 31 pixels, where one of the image patches is a copy of the 31 by 31 pixel area 57 centred on the identified pixel 55, one of the image patches is generated from the pixels in a larger area 56 and the other is generated from the pixels in a smaller area 58. The effect of generating three image patches from three differently sized areas of the image is to generate patches at different scales to take account of the different sizes the face of the operator 9 may appear in an image because of the operator's movement towards or away from the camera 8.

The processing by the image processing module 24 is therefore to generate three image patches associated with each of the identified pixels which normally will correspond to points representing parts of the operator 9. Normally, at least one patch generated for each pixel will correspond to the scale utilised by the first self-organising map 26 for performing an initial classification of an image. This processing therefore allows the effects of an operator 9 moving towards or away from the camera 8 to be removed.

b) First Self Organising Map

Returning to FIG. 2, the first self-organising map 26 comprises: a patch matching module 34, a feature image store 36 and an update module 38.

Specifically the feature image store 36 comprises a data store storing a 15 by 15 array of feature images each feature image being a 31 by 31 pixel image (so that each stored feature image is the same size as an image patch received from the image processing module 24). The feature images initially each comprise random pixel values but, as will be described in detail later, the stored feature images are modified based upon the content of the image patches received from the image processing module 24 and, after an initial set up period, become images representative of a selection of different image patches received from the image processing module 24.

The patch matching module 34 is arranged to process each image patch received from the image processing module 24 to identify the feature image in the feature image store 36 which most closely corresponds to that image patch and to determine a match score indicative of the closeness of the correspondence between the image patch and the identified closest feature image.

Each of the pixels for which image patches were generated is then classified by associating the pixel with the feature image which most closely matches an image patch generated for that pixel. The patch matching module 34 then makes a selection of the pixels utilising the match scores and uses the selection to generate a feature vector which is passed to the second self-organising map 26.

Figure 4:
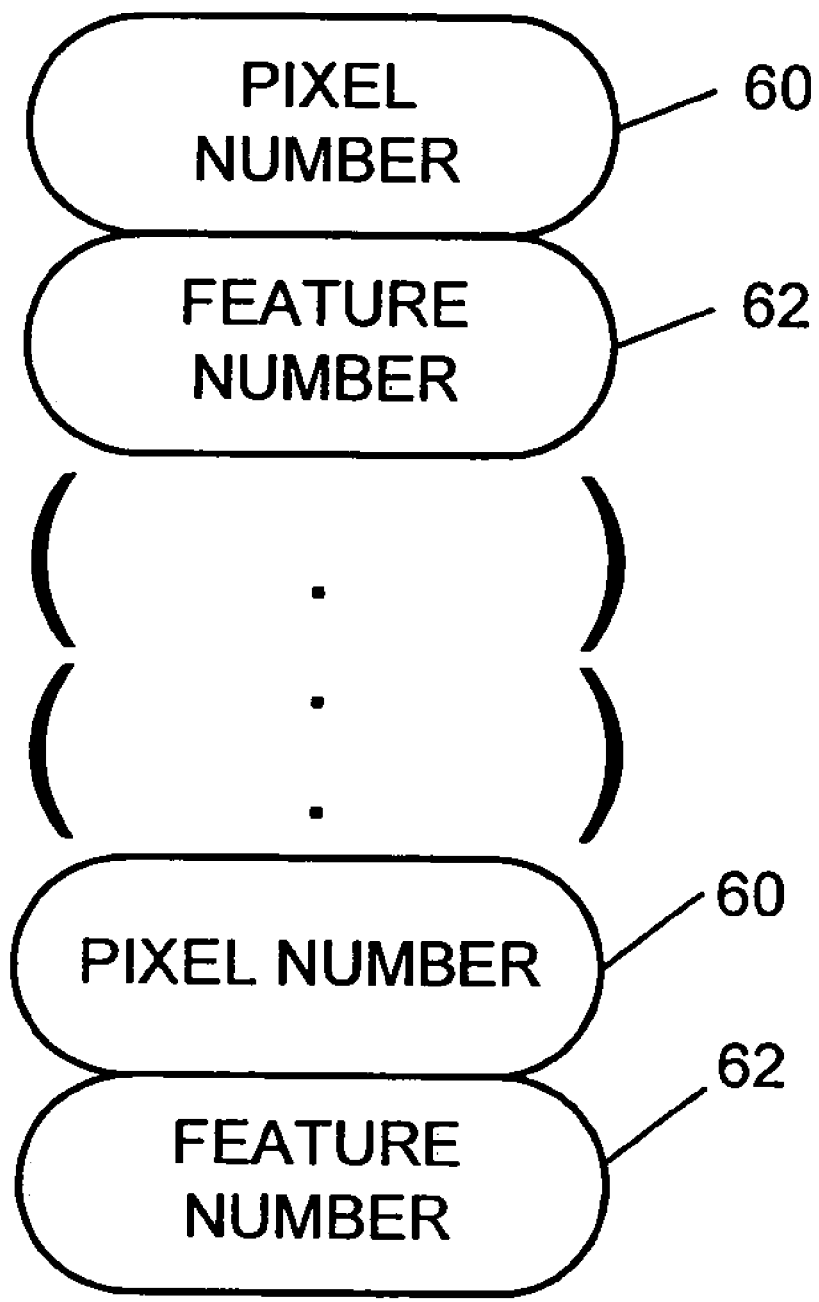
FIG. 4 is an exemplary illustration of a feature vector passed from the first self organising map to the second self organising map of FIG. 2.

FIG. 4 is an illustrative example of the data structure of a feature vector passed by the first self organising map 22 to the second self organising map 26. In this embodiment each feature vector passed by the first self organising map 26 for each image frame comprises data defining each of the selected pixels in the form of a pixel number 60 identifying the pixel in the image, and data 62 comprising a feature number for each selected pixel identifying the feature image within the array of feature images in the feature image store 36 to which an image patch generated from an area centred on the identified pixel most closely corresponds.

Thus for example the following feature vector might be passed to the second self organising map 26 for a particular image frame:

| Pixel No. | Feature No. |
|-----------|-------------|
| 3,572     | 35          |
| 3,625     | 14          |
| 4,945     | 102         |
| 10,674    | 200         |
| 12,745    | 107         |
| 20,982    | 40          |
| 24,003    | 225         | where 1 is the pixel number for the top left corner of an image frame and 25,344 is the pixel number for the bottom right hand corner of the image frame and the feature number for an image patch matched to the feature image stored as the i,jth image in the 15 by 15 array of feature images stored in feature store 36 is i+15(j−1).

Thus for example, the first entry in the above feature vector indicates that an image patch centered on pixel number 3,572, that is the $52^{nd}$ pixel on the $21^{st}$ line of a 176 by 144 pixel image, was for this example determined to most closely correspond to the $35^{th}$ feature image, that is the feature image stored as the fifth image in the third row of the array of feature images in the feature store 36.

For each frame, immediately after a feature vector for the frame has been output, a selection of the generated image patches received from the image processing module 24 for the frame is utilised by the update module 38 to update the feature images in the feature image store 36. As will be described in detail later this processing is such that the random images initially stored in the feature store 36 are updated such that the feature images in the feature image store 36 become increasingly representative of a selection of the image patches received from the image processing module 24. The first self organising map 26, is therefore able to classify image frames in terms of areas of an image frame resembling particular representative feature images in the feature image store 36. It is this initial classification of images in terms of areas identified by pixel numbers 60 and feature images identified by feature numbers 62 which is output from the first self-organising map 26 as a feature vector for processing by the second self-organising map 28.

c) Second Self Organising Map

Returning to FIG. 2, the second self-organising map 28 in this embodiment comprises a table generation module 40, a matching module 42, a table store 44 and an update module 46.

Figure 5A:
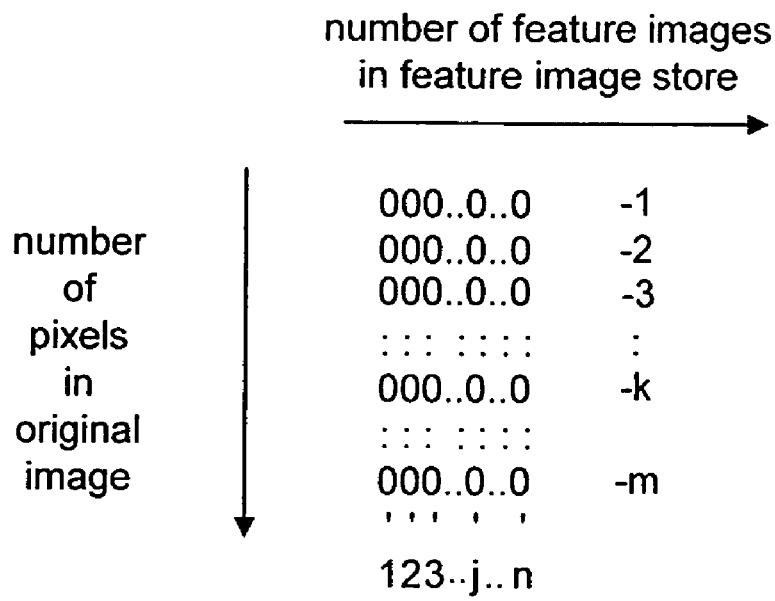
FIGS. 5A and 5B are schematic illustrations for explaining the generation of tables representing feature vectors received by the second self-organising map of FIG. 2.

Initially, as will be described in detail later, the table generation module 40 processes each received feature vector to generate a table representation of that feature vector. Specifically, as is illustrated in FIG. 5A, for each received feature vector the table generation module 40 initially generates a table comprising a set of 0's where each row in the table comprises a number of 0's corresponding to the number of feature images in the feature image store 36 and the number of rows in the table is equal to the number of pixels in an original image recieved from the camera 8.

Thus in the present embodiment where the classification unit 20 is arranged to process images comprising 176×144 pixels and the feature image store 36 is arranged to store a 15×15 array of feature images, the initial table generated by the table generation module comprises a m×n array of 0's where m=176×144 and n=15×15. The table generation module 40 then takes the first pixel number 60 and feature number 62 of the received feature vector and changes the jth entry of the kth row of the generated table to 1 where j is equal to the feature number 62 and k is equal to the pixel number 60 taken from the feature vector.

Figure 5B:
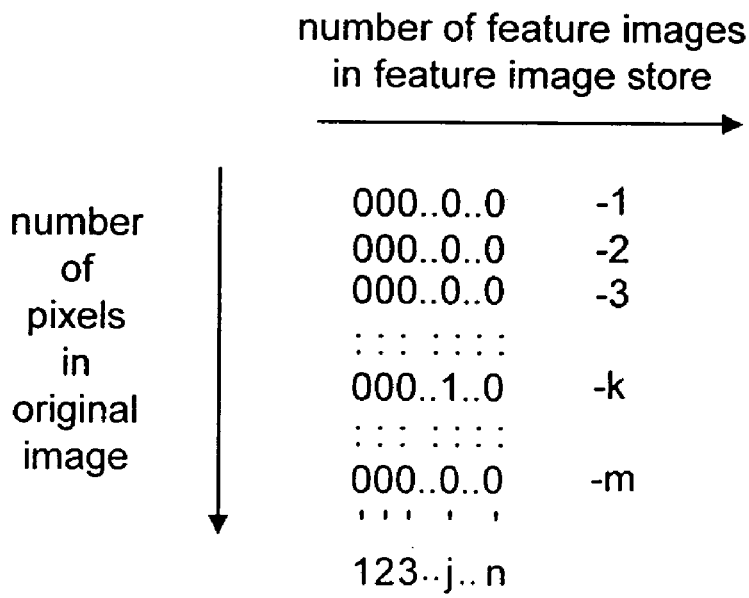

FIG. 5B is a schematic illustration of the table generated by the table generation module 40 after the jth entry of the kth row of the table has been changed to a 1.

This process is then repeated for each of the other pairs of pixel number 60 and feature number 62 forming the rest of the feature vector received from the first self-organising map 26. Thus as a result a sparsely filled table is generated comprising a large number of entries set to 0 and a small number of entries set to 1 where the entries identified by a 1 are at points in the table the co-ordinates of which correspond to the pixel number 60 and feature number 62 pairs of the feature vector.

When a table has been generated by the table generation module 40, the matching module 42 then determines which of the tables stored in the table store 44 most closely corresponds to the generated table.

In this embodiment, the table store 44 is arranged to store a 10×5 array of tables, each of the tables comprising a table having m by n entries, where the entries in each m by n table comprise fractional values ranging between 0 and 1. A classification number identifying the most closely corresponding table is then passed to the calibration unit 22.

After a generated table has been matched to one of the tables in the table store 44, the update module 46 utilises the generated table to update the tables in the table store 44 to make the stored tables more closely resemble the generated table.

Specifically, as in the case of the feature images in the feature image store 36, initially the entries of the tables in the table store 44 are set to different random values, in this case fractional values between 0 and 1. As will be described later, the update module 46 updates the entries of the tables in the table store 44 after processing each image frame. This processing is such that as the second self organising map 28 processes feature vectors output from the first self organising map 26 the stored tables become increasingly representative of tables generated by the table generation module 40. In this way, the classification number for a frame output from the second self organising map 28 is caused to identify that a feature vector received by the second self organising map 28 is similar to an earlier feature vector. This is because the stored tables will have been updated to be representative of the generated tables by the update module 40. This processing therefore enables similar images recorded by the camera 8 to be classified with the same classification number.

As stated previously the processing of the first self organising map 26 is such that after an initial set up period an image frame is assigned a feature vector on the basis of the presence and location of features in the image corresponding to feature images in the image store 36. The subsequent processing of the table corresponding to a feature vector by the second self organising map 28 is such as to assign the same classification number to images where similar features are found in similar areas of an image frame and hence assign the same classification number to image frames of an operator 9 where the operator is looking at the same location.

Calibration Unit

The calibration unit 22 processes each classification number output by the classification unit 20 to determine a pair of gaze co-ordinates identifying the location at which the operator 9 appearing in the image assigned that classification number was looking towards. This is then utilised by the application program 23 to, for example, animate a representation of the operator 9.

In this embodiment, the calibration unit 22 comprises: a conversion table 48, a link table 49 and a co-ordinate update unit 50.

The conversion table 48 stores data associating each classification number which can be output by the second self organising map 28 with a set of gaze co-ordinates identifying an area where an operator may be directing his gaze. Initially the gaze co-ordinates associated with each classification number are set to random values.

The link table 49 is initially empty. When image classifications are received from the classification unit 20, the link table 49 is updated to store data identifying which pairs classifications have been assigned to consecutive image frames. Thus for example if consecutive images were to be assigned the classification numbers 40 and 37, data identifying the pairs of numbers 40-37 and 37-40 would be stored in the link table 49.

Each time a classification number for a new frame is received by the calibration unit 22, it is first compared with the classification number received for the previous frame. If the two classification numbers are different, the link table 49 is then checked to determine whether data identifying that pair of classification numbers has been stored in the link table 49. If this is not the case the pair of classification numbers for the current frame and previous frame are added to the data stored in the link table 49.

As consecutive frames matched to different classification numbers represent images of the operator 9 looking at the screen 3 separated by a time period corresponding to the frame rate of the camera 8, it can be assumed that the points on the screen 3 at which an operator 9 is looking at those times must be adjacent. In contrast, if consecutive image frames are never matched to a particular pair of classification numbers, it is probable that the classification numbers represent an operator 9 looking at portions of a screen 3 distant from one another.

The co-ordinate update unit 50 utilises the data stored in the link table 49 to set the gaze co-ordinates associated with each classification number in the conversion table 48 so that co-ordinates associated with pairs of classification numbers which are assigned to consecutive image frames are made indicative of adjacent areas, and co-ordinates associated with pairs of classification numbers which are never assigned to consecutive image frames are made indicative of areas further apart.

More specifically, after the link table 49 has been updated, the co-ordinate update unit 50 considers each possible pair of classification numbers in turn. Where a pair of classification numbers is identified by data in the link table 49, and the gaze co-ordinates for the classification numbers identify areas far apart, the gaze co-ordinates are updated by the co-ordinate update unit 50 to identify areas closer together. Conversely, where a pair of classification numbers is not identified by data in the link table 49 and the gaze co-ordinates for the classifications numbers identify adjacent areas, the gaze co-ordinates are updated by the co-ordinate update unit 50 to identify areas further apart. After processing a number of image frame classifications, to update the gaze co-ordinates in the above manner, the relative positions of the areas identified by gaze coordinates associated with different classification numbers are correctly assigned.

The setting of gaze co-ordinates utilising the link data enables the relative locations of areas associated with different classification numbers to be determined. However, the determined co-ordinates for the areas can differ from absolute co-ordinates locations for the areas by being a reflection or rotation of the absolute positions or by being displaced. To ensure that the relative co-ordinates correspond to actual positions, further information is required to determine whether the relative co-ordinates have been reflected, rotated and/or displaced.

In this embodiment the co-ordinate update unit 50 identifies image frames obtained when a position on the screen of the display 3 is selected using the pointer 11 under the control of the mouse 7. When this occurs, it is reasonable to assume that the image frame recorded when the mouse button was pressed is indicative of an image obtained of the operator 9 looking at the selected position on the display 3. The click co-ordinates identifying the selected position on the screen of the display 3 therefore identify an absolute co-ordinate position for the operators gaze for the frame obtained when the mouse 7 was clicked. This absolute co-ordinate position, is in this embodiment used to fix the gaze coordinates associated with the classification number for that frame.

The relative positions determined by the co-ordinate update unit 50 using data in the link table 49 and the absolute positions identified by mouse click data together enable all of the classification numbers to be associated with gaze co-ordinates indicative of the location of an operator's gaze when an image assigned that classification is recorded.

Once the conversion table 48 has been updated, the conversion table 48 is used to convert the classification number for the image frame being processed into a pair of absolute gaze co-ordinates for the frame which are passed to the application program 23 which utilises the gaze coordinates to for example animate a virtual representation of the operator 9.

Processing by Image Processing Module

The processing operations performed by image processing module 24 will now be described in detail.

Figure 6:
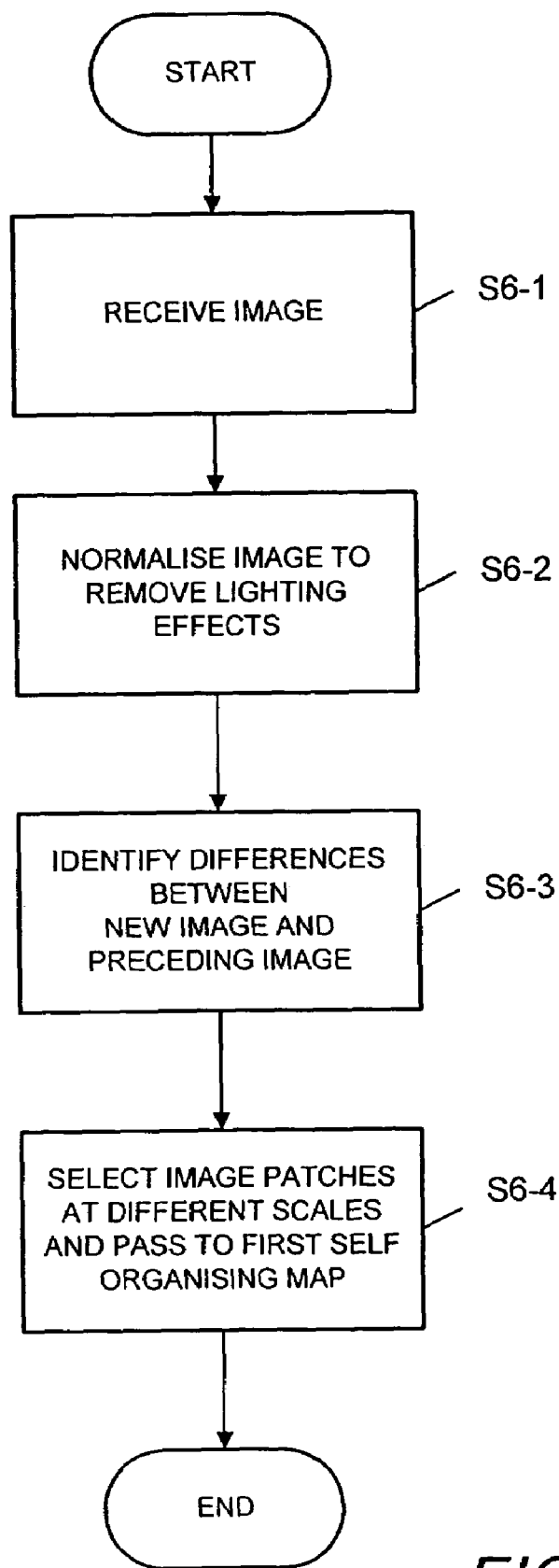
FIG. 6 is a flow diagram of the processing operations performed by the image processing module of FIG. 2.

Referring to FIG. 6 which is a flow diagram of the processing operations performed by the image processing module 24, initially (S6-1) the image processing module 24 receives a frame of image data from the camera 8 directed towards the operator 9 of the computer 1.

The image processing module 24 then passes the received image frame to the lighting normalisation module 30 which (S6-2) processes the received image to account for variation in illumination of the operator 9 of the computer 1.

Identifying colour features (e.g. the position of eyes, hairline, edge of face, mouth etc.) in a sequence of colour images obtained via camera 8 is difficult because the assigned colour of pixels in an image is dependent upon a combination of the actual colour of the surfaces the pixels represent and the colour of the illumination of those surfaces. Unless illumination is carefully controlled, utilising colour image data to identify features in images is therefore unreliable. One solution to overcome this problem is to ignore the colour information and use grey scale, or edge/line information obtained by processing the image. Although this is more reliable than relying directly upon colour information, such processing is less powerful as much of the data within received images is ignored.

In this embodiment, in order to remove the contribution to the apparent colour of portions of an image which arise due to illumination, the lighting normalisation module 30 processes the entire image utilising the Retinex model as is described in E. Land and J. McCann, "Lightness and Retinex theory", Journal of the Optical Society of America, 61: 1–11, 1971 and J McCann, "Lessons Learned from Mondrians Applied to Real Images and Colour Gamuts", Imaging Science and Technology Reporter, Volume 14 No.6, 1999, which are both herein incorporated by reference.

The processing of an image frame utilising the Retinex algorithm substantially removes from the image frame variations in apparent colour arising due to changes in illumination. This is because, the effect of the processing is to scale the colour information relative to the brightest and darkest points on the image whilst retaining the ratios of the red, green and blue for each pixel. As a result of the processing, the skin colour of a particular operator 9 appearing in images is made substantially consistent for images obtained under different lighting conditions as the resultant processed images effectively correspond to reflectances rather than colours and hence are not lighting dependent. However, as reflectance information is retained, variations in reflectance can still be utilised to identify features in images, which is not possible where images are processed by being converted to grayscale data.

After the image received from the camera 8 has been processed by the lighting normalisation module 30 to generate a reflectance image, the image processing module 24 then passes the generated reflectance image to the patch generation module 32. The patch generation module 32 then (S6-3) compares the generated reflectance image with the reflectance image which was the result of processing the previous image frame received from the camera 8.

Specifically, the patch generation module 32 compares each pixel in the newly generated reflectance image with the corresponding pixel in the reflectance image generated for the immediately previous image frame obtained by the camera 8. The red, green and blue values for the corresponding pixels are compared. When the difference in the R, G, or B pixel values for the corresponding pixels are greater than a threshold value, for example where the R, G, B values each range between 0 and 255, a threshold value of 5 for any colour, the pixel number for the pixel which differs from the pixel in the previous image is added to a list by the patch generation module 32.

Differences in pixel values between consecutive frames obtained by the camera 8 will primarily arise due to the motion of the operator 9 as viewed by the camera 8 because the background will largely be static. The effect of processing successive video images received from the camera 8 in this way therefore causes the patch generation module 32 to generate a list of pixels numbers identifying the positions of pixels in an image which are most likely to represent portions of the operator 9. Typically the pixels identified as changing will identify pixels representing the edges of an operators head and facial features of distinct colour e.g. the edge of an operator's lips, eyes and hair line, as these pixels will change colour as an operator 9 moves.

When a list of pixels in the image which vary from the previous processed image has been generated, the patch generation module 32 then, for each of the pixels identified in the list generates (S6-4) from the image a number of image patches for the pixels. Specifically, in this embodiment which is arranged to process camera images comprising 176 by 144 pixels, the patch generation module 32 generates for each pixel in the list three 31 by 31 image patches derived from three differently sized areas of the image centered on each pixel on the list.

Thus for example as is illustrated in FIG. 3, for the pixel 55 identified in the figure, the patch generation module 32 would generate three image patches, one derived from each of the differently sized areas identified as 56, 57 and 58 in the figure each of the differently sized areas being centred on the pixel 55.

In this embodiment the three differently sized areas 56, 57, 58 utilised to generate 31×31 pixel image patches comprise a 25×25 pixel area 56 of an image centred on the identified pixel 55, a 31×31 pixel area 57 of an image centered on the identified pixel 55, and a 37×37 pixel area 57 centred on the identified pixel 55.

For the 31×31 pixel area 57, a 31×31 pixel image patch is generated by copying the pixel data for the area 57. For the 25×25 pixel area 56, a 31×31 pixel image patch representative of the area 56 is calculated utilising the pixel data for the area 56 and interpolating to obtain pixel data for a 31 by 31 pixel image patch. For the 37×37 pixel area 58 a 31×31 pixel image patch representative of the area 58 is calculated utilising the pixel data for the area 58 and averaging to obtain pixel data for a 31×31 pixel image patch.

In this way, three 31 by 31 image patches are generated for each of the pixels identified in the list generated by the image patch generation module 32. The effect of generating 31 by 31 pixel image patches from three differently sized areas centered on a pixel is to scale the images contained in those areas to a lesser or greater extent. Where an operator 9 moves towards or away from the camera 8, the size of the portion of the image corresponding to the operator 9 will change. The scaling which results from using three different sized areas to generate three image patches for each identified pixel in this embodiment attempts to counteract these variations in apparent size of an operator 9. Specifically, generating three differently scaled image patches centered in each pixel usually ensures that at least one of the image patches corresponds to a scale which the first self-organising map 26 is arranged to process as will now be described.

Processing by First Self Organising Map

Figure 7:
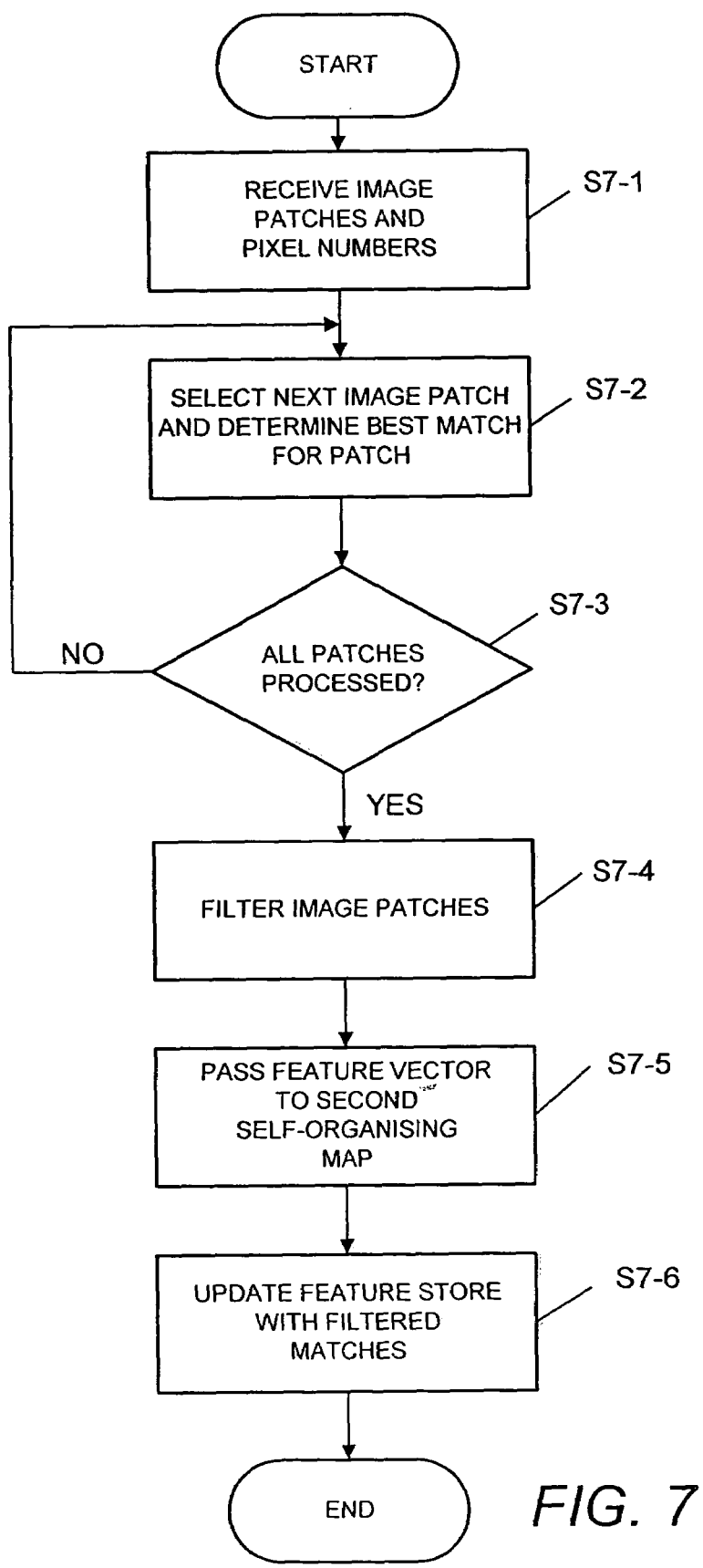
FIG. 7 is a flow diagram of the processing operations performed by the first self organising map of FIG. 2.

Referring to FIG. 7 which is a flow diagram of the processing performed by the first self organising map 26, initially (S7-1) the first self organising map 26 receives from the image processing module 24 a generated list of pixel numbers identifying pixels in the reflectance image which have varied for a frame compared to the reflectance image for the previous frame, together a set of image patches for each pixel number in the list (each set comprising three 31 by 31 pixel images generated from portions of the images centred on the corresponding pixel identified in the list).

The patch matching module 34 then (S7-2) selects the first of the received image patches and determines which feature image in the feature image store 36 most closely corresponds to the first image patch.

As has been stated previously, the feature image store 36 comprises a data store storing a 15 by 15 array of 31 by 31 pixel images. In order to determine which stored feature image most closely corresponds to the image patch being processed, the patch matching module 34 determines a match score for each of the stored feature images indicative of the correspondence between the stored feature image and the image patch being processed.

In this embodiment, the match score for each feature image is determined by calculating for each pixel in the image patch the normalised dot product of a vector characterising the colour of the pixel in the image patch and a vector characterising the colour of the corresponding pixel in the feature image stored in the feature image store 36.

Thus for example, where pixel (i) in the image patch being processed has red, green and blue values $R_P(i)$, $G_P(i)$ and $B_P(i)$ and the corresponding pixel (i) in the feature image being compared with the image patch have red, green and blue values $R_F(i)$, $G_F(i)$, $B_F(i)$ a normalised dot product for pixel (i) is calculated using the following equation, where $\Sigma$ is a summing operation over all pixels in an image patch.

$$\text{Dot Product} = \frac{R_P(i)R_F(i) + G_P(i) + B_P(i)B_F(i)}{\sqrt{\Sigma(R_P(i))^2 + \Sigma(G_P(i))^2 + \Sigma(B_P(i))^2} \sqrt{\Sigma(R_F(i))^2 + \Sigma(G_F(i))^2 + \Sigma(B_F(i))^2}}$$

The total of the sum of the dot products for each of the pixels in the image patch and the feature image is then determined. This match score is representative of the correspondence between the image patch and the feature image.

When an image is processed utilising the Retinex algorithm, the contribution to apparent colour arising from illumination of objects in an image is substantially removed. However, although the hue of a pixel in a processed image is substantially independent of the illumination of objects in an image, the brightness of a processed pixel will not necessarily be constant. However, the match scores for the comparison between image patches and feature images generated in the above manner are independent of the brightness of a pixel. This is because for each pixel in an image patch the normalised dot product for a pixel in the image patch and the corresponding pixel in a feature image is dependent upon only the relative ratios of the red, green and blue values for the two pixels.

Thus for example if a pixel in an image represents an object having a true colour represented by red, green and blue values $R_I(i)$, $G_I(i)$ and $B_I(i)$, the processing of an image utilising the Retinex algorithm will generate red, green and blue values $R_P(i)$, $G_P(i)$, $B_P(i)$, such that $R_P(i)=\lambda R_I(i)$, $G_P(i)=\lambda G_I(i)$ and $B_P(i)=\lambda B_I(i)$, where $\lambda$ is a scaling factor dependent upon illumination of the object in an image. The normalised dot product for that pixel and a corresponding pixel in a feature image having red, green and blue values $R_F(i)$, $G_F(i)$ and $B_F(i)$ is then:

$$\frac{\lambda R_I(i)R_F(i) + \lambda G_I(i)G_F(i) + \lambda B_I(i)B_F(i)}{\sqrt{\sum (\lambda R_I(i))^2 + \sum (\lambda G_I(i))^2 + \sum (\lambda B_I(i))^2} \sqrt{\sum (R_F(i))^2 + \sum (G_F(i))^2 + \sum (B_F(i))^2}}$$

The match score for a feature image and an image patch as the sum of normalised dot products is then equal to:

$$\frac{\sum \lambda[(R_I(i)R_F(i) + G_I(i)P_F(i) + B_I(i)B_F(i)]}{\sqrt{\sum (\lambda R_I(i))^2 + \sum (\lambda G_I(i))^2 + \sum (\lambda B_I(i))^2} \sqrt{\sum (R_F(i))^2 + \sum (G_F(i))^2 + \sum (B_F(i))^2}} =$$

$$\frac{\sum (R_I(i)R_F(i) + G_I(i)G_F(i) + B_I(i)B_F(i)}{\sqrt{\sum (R_I(i))^2 + \sum (G_I(i))^2 + \sum (B_I(i))^2} \sqrt{\sum (R_F(i))^2 + \sum (G_F(i))^2 + \sum (B_F(i))^2}}$$

The match score is therefore independent of any scaling factors introduced by the processing of the Retinex algorithm.

When match scores have been determined for the comparison of the image patch being processed and each of the feature images in the feature image store 36, the patch matching module 34 records for the image patch, data identifying the feature image in the image store 36 which resulted in the greatest match score for the image patch together with data defining the greatest match score.

The patch matching module 34 then (S7-3) determines whether all of the image patches received for a frame from the image processing module 24 have been processed. If this is not the case the next image patch is selected (S7-2) and greatest match score and best matching feature image from the feature image store 24 are determined for that next image patch.

Thus in this way each of the image patches passed by the image processing module 24 to the first self organising map 26 is compared with each of the feature images stored in the feature image store 36 and data identifying the feature images within the feature image store 36 which most closely correspond to these image patches is recorded.

When all of the image patches have been processed and a best match score and closest matching feature image within the feature image store 36 have been determined for each image patches, the image patches are then filtered (S 7-4).

Specifically, for each of the three image patches generated from areas of an image centred on the same pixel, the image patch associated with the greatest match score is determined. The remaining two image patches generated from areas centred on that pixel are then discarded.

As discussed previously, the generation of three 31 by 31 pixel image patches from three differently sized areas of an image centred on the same pixel has the effect of generating three image patches where parts of an image have been scaled to a lesser or greater extent. The determination of which of the three image patches is associated with the highest match score indicates which of the three scales causes the selected portion of an image to most closely correspond to one of the stored feature images. By discarding the remaining two image patches, the patch match module 34 ensures that the image patch corresponding to the scale of images stored in the feature store 36 for which matching should be most accurate is used for subsequent processing.

The patch matching module 34 then determines for each of the remaining image patches the extent to which the area of the image used to generate each image patch overlaps any of the areas of the image used to generate any of the other remaining image patches. Where the area for an image patch is determined to overlap the area for another image patch by at least 50% of the area of a patch, the patch matching module 34 identifies the image patch with the greatest match score and discards the other patch.

The selection of areas for generating image patches by the image processing module 24 is, in this embodiment, based upon the identification of pixels in an image frame determined to vary in colour by more than a threshold value from corresponding pixels in a previous frame. Although monitoring for changes in colour values enables some pixels to be identified as corresponding to part of an operator, it cannot be guaranteed that exactly the same points on an operator will necessarily give rise to the same detected changes in colour. In view of this it is desirable that an image is classified in terms of certain features appearing in identified areas of an image.

If two pixels close to one another are identified as having varied in colour, the image patches generated for those pixels will correspond to areas which largely overlap one another. Further it is likely that the generated image patches will be similar and hence matched with similar or the same feature image. Rather than utilising all of the image patches to characterise an image, in this embodiment, only the most closely matching image patch to a stored feature image for image patches for substantially overlapping areas is utilised to identify an area of an image as resembling a particular feature image. This filtering of image patches also ensures that the image patches used to update the stored feature images are relatively distinct from one another as will be described later.

When the image patches have been filtered, the first self organising map 26 then (S7-5) passes a feature vector to the second self organising map 28 for the image frame currently being processed. As has previously been described with reference to FIG. 4, this feature vector comprises a list of pairs of pixel numbers 60 and feature numbers 62, where each pixel number 60 identifies a pixel in the image frame and each feature number 62 identifies which of the feature images stored in the feature image store 36 most closely resembles an image patch centred on the identified pixel. The generated feature vector is therefore an initial classification of an image frame which identifies the locations of areas in the image frame which resemble stored feature images.

After a feature vector for an image frame has been passed from the first self-organising map 26 to the second self-organising map 28, the first self-organising map 26 then (S7-6) causes the update module 38 of the first self-organising map 26 to update the feature images in the feature image store 36, utilising the filtered image patches selected by the patch generation module 34.

Figure 8:
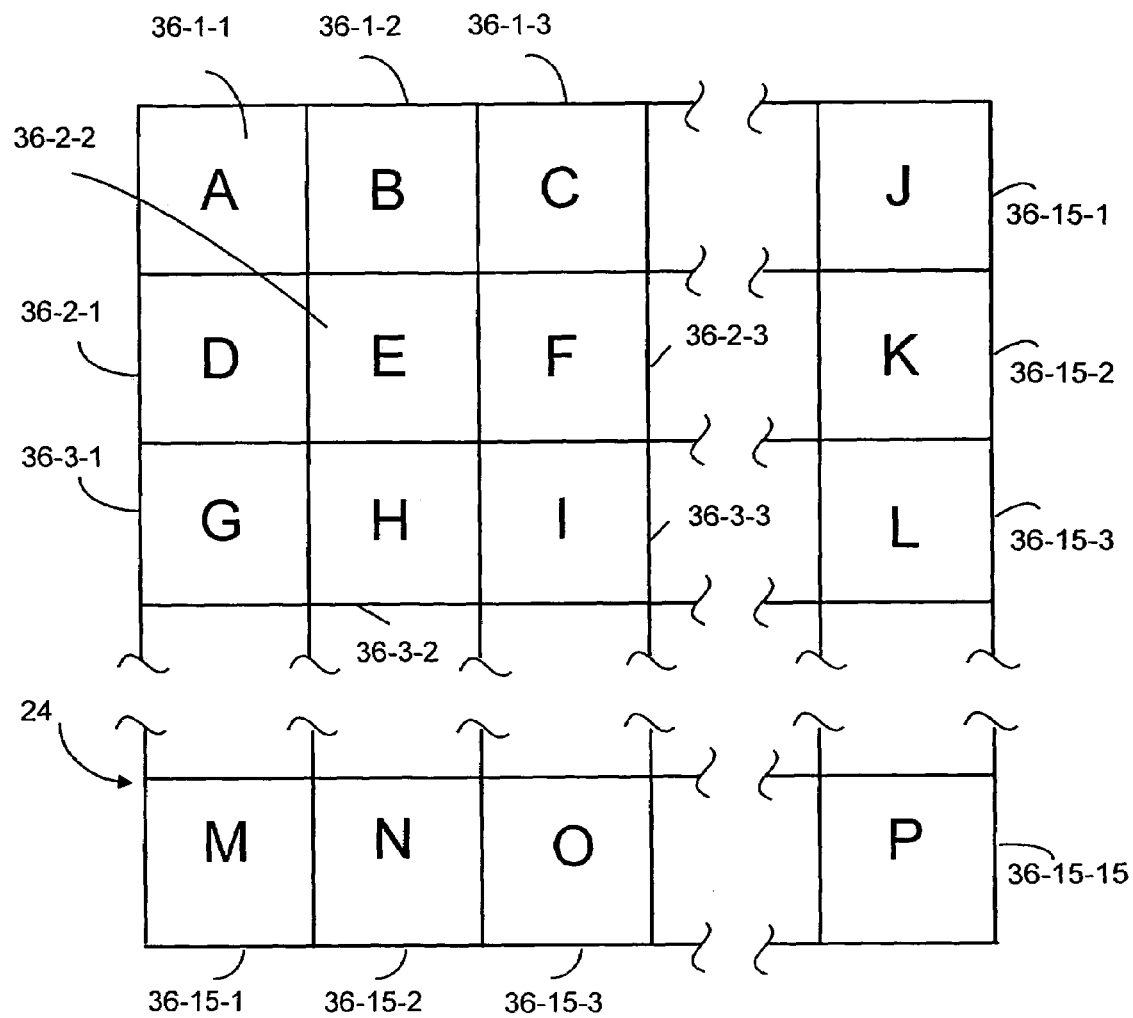
FIG. 8 is a schematic illustration of a self organising map for explaining the interaction of the update module, the patch matching module and the feature image store of FIG. 2.

FIG. 8 is a schematic illustration of a 15 by 15 array of feature images 36-1-1 to 36-15-15 stored within the feature image store 36. As stated previously, in this embodiment, each of the feature images 36-1-1 to 36-15-15 initially comprises a 31 by 31 pixel image where the red, green and blue values for each pixel are randomly assigned. Each time, a set of image patches is processed by the first self-organising map 26 the filtered set of image patches determined for an image frame is utilised to amend these stored feature images 36-1-1 to 36-15-15.

The result of this processing is that after a number of image frames have been processed, the feature images become representative of typical image patches filtered by the patch matching module 34.

More specifically, using each of the filtered image patches in turn, each pixel in each of the filtered image patches is utilised to update the pixel values of corresponding pixels in each of the feature images in the feature image store 36. This updating is achieved for each pixel in a feature image by determining a weighted average of the stored pixel values for the feature image pixel and the pixel values for the corresponding pixel from the image patch.

Thus, each of the Red, Green and Blue values for a pixel in a feature image is updated utilising the following equation:

$$\text{Pixel}_{new} = r \cdot \text{Pixel}_{patch} + (1-r)\,\text{Pixel}_{old}$$

where $\text{Pixel}_{new}$ is the new colour value for the feature image being updated; $\text{Pixel}_{patch}$ is the corresponding colour value for the corresponding pixel in the image patch being used to update the feature images; and $\text{Pixel}_{old}$ is the colour value for the corresponding pixel in the feature image being updated, and r is a weighting factor which varies depending upon the number of frames which have been processed by the first self-organising map 20, the location in the array of the feature image being updated, and the location in the array of the feature image which has been determined to most closely correspond to the image patch being used to update the feature images in the feature image store 36.

In this embodiment this weighting factor r is determined by the equation:

$$r = \eta e^{-D^2/2\sigma^2}$$

with $$\eta = \eta_o e^{-t/T} + \eta_{oo}$$

and $$\sigma = \sigma_o e^{-t/T} + \sigma_{oo}$$

where t is the frame number of the frame being processed, $$\theta_o,\ T,\ \theta_{oo},\ \rho_o \text{ and } \rho_{oo}$$

are constants which this embodiment are set to the following values:

$$\theta_o = 0.1,\ T = 10{,}000,\ \theta_{oo} = 0.001$$

$$\sigma_o = \sqrt{15^2 + 15^2} \approx 21,\ \sigma_{oo} = 0.25; \text{ and}$$

$$D^2 = (x_f - x_m)^2 + (y_f - y_m)^2$$

where $x_f, y_f$ are the co-ordinates within the array of feature images stored in the feature image store 36 of the feature image being updated and $x_m, y_m$ are the coordinates within the array of the feature images stored in the feature image store 36 matched to the image patch being utilised to update the stored feature images.

The practical effect of updating the feature images 36-1-1 to 36-15-15 using the above equation is that the weighted averages are dependent upon both time (in terms of a number of image frames which have been processed by the first self-organising map 26) and a distance value D dependent upon the relative location within the array of feature images stored in the feature image store 36 of the feature image to which an image patch has been matched and the feature image being updated. As the number of frames processed by the first self-organising map 26 increases the weighting factor r decreases so that the extent to which the feature images vary as a result of an update reduces. Similarly, as the distance D between the location in the array identifying the feature image being updated and the feature image determined to most closely correspond to the image patch being used to update the feature images increases, the weighing factor decreases.

Thus, for example, when an image patch is determined to most closely correspond to the feature image 36-2-2 marked E in FIG. 8, initially due to the size of the weighting factors the pixel values all of the feature images including those marked J, K, L, M, N, 0, P are updated using the feature image matched to image E 36-2-2. As the total number of frames processed increases, gradually the weighting factor used for update image P 36-15-15 which is remote from image E 36-2-2 in the array is reduced such that the effect of the update for an image patch matched to image E 36-2-2 is negligible.

As the number of frames increases further, gradually this is also true for all of the feature images stored in the portions of the array remote from the feature image matched to the image patch being used to update the feature images. Thus for example, in the case of an image patch determined to most closely correspond to the feature image E 36-2-2 only feature images A, B, C, D, E, F, G, H and I will be effectively updated by the update module 38.

The combined effect of processing a number of frames of image patches is two-fold. Firstly, as the feature images are updated utilising weighted averages, the feature images are made to resemble the image patches most frequently output by the image processing module 20. Secondly the effect of the weighted averages is such as to make adjacent images similar. The feature store 36 after processing a number of frames, for example a few hundred frames, therefore becomes a self-ordered selection of feature images where similar images are grouped together in adjacent areas in the array.

After all of the feature images in the feature image store 36 have been updated using one image patch, the update module 38 then proceeds to update the stored feature images using the next image patch until of the feature images have been updated using all of the image patches which remain after the image patches have been filtered by the patch matching module 36.

As the feature images in the feature image store 36 come to resemble an ordered representative sample of image patches from images obtained by the camera 8, the identification of a particular image patch with a particular feature image therefore will indicate that a particular portion of the operator, identified by a stored feature image is located at a certain position in the processed camera image. As the operator 9 then moves their head to look at different portions of the display 3, the features present in obtained images and positions of features will change. The feature vectors output by the first self organising map 26 track these changes and therefore provide an initial classification of an image.

This initial classification by the first self organising map 26 is then processed by the second self organising map 28 to assign a single classification number to each image frame where images of an operator 9 looking at the same part of the display 3 are consistently assigned the same classification number.

The processing of the second self organising map 28 will now be described in detail.

Processing by Second Self-Organising Map

Figure 9:
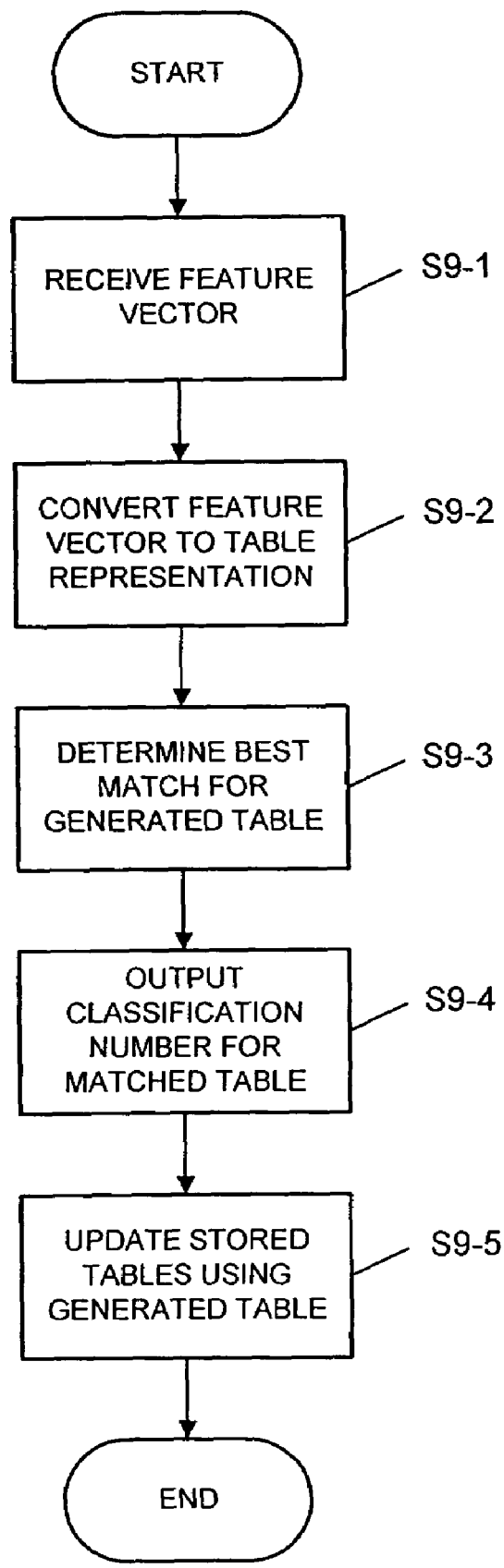
FIG. 9 is a flow diagram of the processing operations performed by the second self organising map of FIG. 2.

FIG. 9 is a flow diagram of the processing operations performed by the second self-organising map 28.

Initially (S9-1) the second self-organising map 28 receives from the first self-organising map 26 a feature vector comprising a list of pixel numbers 60 each with an associated feature number 62 as is illustrated in FIG. 4. As detailed above, these pairs of pixel numbers 60 and feature numbers 62 are an initial classification of an image that identify that image patches centered on the pixels identified by the pixel numbers 60 have been matched by the first self-organising map 26 to the feature images identified by the associated feature numbers 62.

The table generation module 40 of the second self-organising map 28 then (S9-2) proceeds to generate a table representation of the data received as a feature vector from the first self-organising map 26.

Specifically, as illustrated by FIGS. 5A and 5B and as previously described, the table generation module 40 first generates a table, all of whose entries are set to zero where the number of rows in the table corresponds to the number of pixels in an image frame processed by the classification unit 20 and the number of columns corresponds to the number of feature images stored in the feature image store 36.

Taking each of the pairs of pixel numbers 60 and feature numbers 62 of the feature vector in turn, the table generation module 40, then alters the entry in the row corresponding to the selected pixel number and the column corresponding to the selected feature number 62 by setting the value of that entry to one. This operation is then repeated for the next pair of pixel numbers 60 until the entire feature vector has been processed.

When a table has been generated by the table generation module 40 the matching module 42 then calculates (S9-3) for each of the tables in the array of tables stored in the table store 44, a match score based on a comparison of the entries of the generated table with the corresponding entries of the tables in the array of tables in the table store 44.

Specifically, in this embodiment, the match score for a match between the generated table and a stored table is calculated by:

$$\text{match score} = \sum^{m,n} (g(j,k) - s(j,k))^2$$

where g (j,k) is the value of the jth entry of the ith row of the generated table; s(j,k) is the value of the jth entry of the ith row of the stored table for which a match score is being calculated; and m and n are equal to the number of pixels in the original image and the number of features the image store respectively.

The calculation of match scores in the above manner will cause the table in the table store 44 which most closely resembles the generated table to be associated with the lowest match score. When the stored table in the table store 44 having the lowest match score has been determined, the matching module 42 then (S9-4) outputs as a classification number for the frame of image data being processed a number identifying that table in the table store 44.

Once the matching module 42 has output a classification number for a particular image frame, the matching module 42 then causes the update module 46 to update (S9-5) the array of tables stored in the table store 44.

This updating of tables in the table store 44 is performed in the same way in which the update module 38 of the first self-organising map 26 updates the feature images in the feature image store 36 with the image patches as is previously been described.

That is to say each of the entries in the tables in the array is updated to be a weighted average of the entry in the stored table and the corresponding entry in the table generated by the table generation module 40 where the weighted average is dependent upon the number of image frames which have been processed and the distance between the table in the array identified as the best match for the generated table and the stored table which is being updated.

Thus in a similar way in which the feature images in the feature image store 36 are updated so that they become increasingly representative of the image patches received by the first self-organising map 26, updating the tables in table store 44 in this manner causes the stored tables to become an ordered representative sample of tables having high and low values in areas where ones and zeros respectively are located in tables generated by the table generation module 40.

The combined processing of the image processing module 24 and the first and second self organising maps 26, 28 after an initial set up period is therefore such that each image frame in the stream of images received from the camera 8 is identified with one of the 10×5 array of tables in the table store 44 and hence with one of 50 possible classifications where the classifications are dependent upon the location of features identified as appearing within parts of the images of the stream of video images received from the camera 8. These classifications will therefore assign the same classification number to images of an operator where the operator looks at the same location.

Processing by Calibration Unit

The calibration unit 22 receives the classification number for each image in a stream of images processed by the classification unit 20. The calibration unit 22 then proceeds to convert each of these classification numbers into data identifying gaze co-ordinates as will now be described in detail with reference to FIGS. 10A–D, 11, 12 and 13.

As explained previously, because consecutive frames are images obtained of an operator 9 at times separated by the frame rate for the camera 8, it is reasonable to assume that the operator 9 can only move their gaze a certain distance in the time period between consecutive images (the distance being determined by the angle through which the operator is reasonably likely to turn his head during the period between frames). If consecutive images are classified under two different classifications, this therefore provides an indication that the area of gaze represented by those two classifications must be adjacent to one another. Conversely, if consecutive image frames are never classified as corresponding to a particular pair of classification numbers, this indicates that the areas represented by those classifications are not adjacent to one another.

By monitoring classification numbers assigned to consecutive images, as will be described in detail later a link table 49 identifying pairs of classification corresponding to adjacent areas is generated by the calibration unit 22. This link table 49 is generated as a video stream of images is processed. The co-ordinate update unit 50 then utilises this data to update gaze coordinates associated with the classification numbers so that the relative positions of the areas identified by the classification numbers can be determined.

Information that certain classification numbers identify adjacent areas is sufficient to determine the relative positions identified by those classifications as will now be explained by way of an initial overview with reference to a simple example illustrated by FIGS. 10A–D, illustrating how relative positions of points on a grid can be determined using data identifying which points are adjacent to one another on that grid.

FIG. 10A is an illustration of a grid of points 101-109 and FIG. 10B is an illustration of the same points assigned to random positions.

The following table identifies for the points 101-109 of FIG. 10A the adjacent points on the grid.

| Point | Adjacent Points |
|---|---|
| 101 | 102, 105, 104 |
| 102 | 101, 103, 104, 105, 106 |
| 103 | 102, 105, 106 |
| 104 | 101, 102, 105, 108, 107 |
| 105 | 101, 102, 103, 104, 106, 107, 108, 109 |
| 106 | 102, 103, 105, 108, 109 |
| 107 | 104, 105, 108 |
| 108 | 104, 105, 106, 107, 109 |
| 109 | 105, 106, 108 |

As will be described in detail the processing of the calibration unit 22 is such to cause a link table 49 containing data identifying classification numbers corresponding to adjacent areas to be generated as a video stream is processed. The gaze co-ordinate update unit 50 then utilises this data to update the gaze coordinates associated with the classifications which in this embodiment are initially set to random values. This updating is such to cause gaze co-ordinates for classification identifying non-adjacent areas to be moved further apart and gaze co-ordinates identifying adjacent areas to be moved closer together.

In the same way, the information about adjacent points in the original grid of FIG. 10A can be utilised to reconstruct that grid from the random co-ordinates assigned to points illustrated in FIG. 10B.

Specifically, the co-ordinates of the points in FIG. 10B can be updated so that where points are less than a set distance apart (in this example the set distance is equal to the distance between points 101 and 102 in the original grid) and they do not identify adjacent areas, they are moved away from one another; where two points identify adjacent areas and they are further than this distance apart they are moved closer together.

Figure 10C:
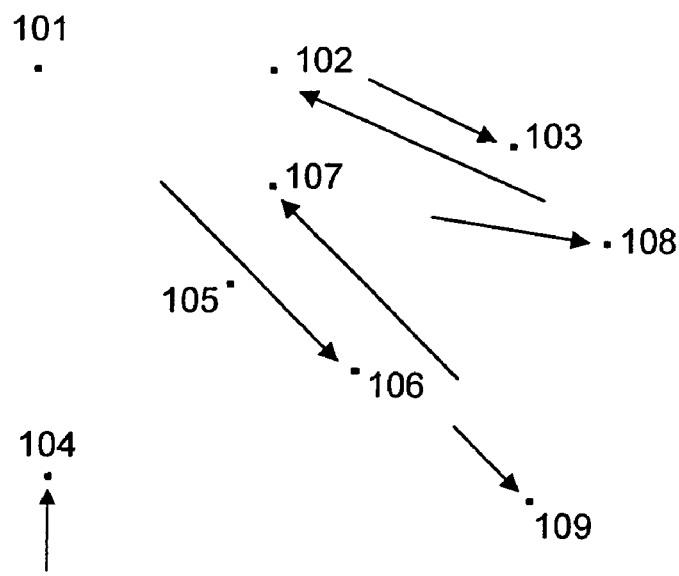

Considering point 102, as shown in FIG. 10B, initially in FIG. 10B point 102 is close to point 108 but remote from points 101, 103, 104, 105 and 106 which as shown in the table above were all adjacent points to point 102 in the original grid of FIG. 10A. By updating the coordinates of point 102 by moving it towards points 101, 102, 103 and 104 and away from other nearby points, the co-ordinates of point 102 are updated to be in the position of point 102 shown in FIG. 10C. In FIG. 10C the arrow pointing towards point 102 illustrates the change in co-ordinates assigned to 102 between FIGS. 10B and 10C. The other points and arrows in FIG. 10C illustrate the change in co-ordinates assigned to the other points 101–104 by considering each of the points in turn and applying the same processing to those points so as to move the points towards the other points identified by as adjacent points in the original grid of FIG. 10A and away from other nearby points.

Figure 10D:
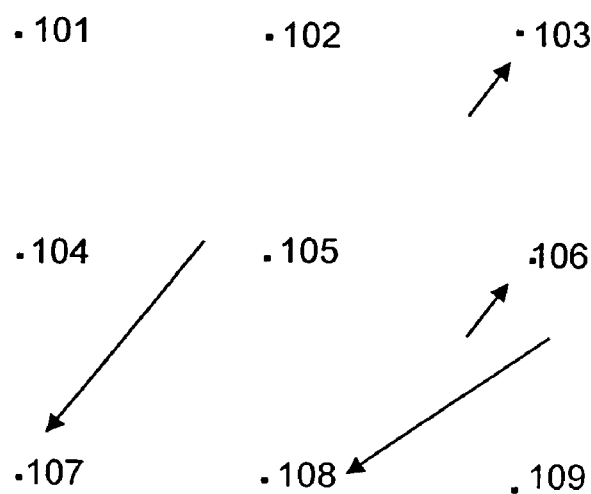

FIG. 10D illustrates the co-ordinates assigned to points 101–109 after repeated processing of co-ordinates in the manner described above to cause adjacent points as identified by the table to identify points closer together and to alter co-ordinates of points not identified by the table as adjacent points further apart. In FIG. 10D the arrows illustrate the change of coordinates of the points the arrow identify relative to the positions shown in FIG. 10C.

As can be seen in FIG. 10D the processing after a number of iterations eventually causes the positions of points to be realigned in the arrangement of the grid of FIG. 10A based solely on identifying the pairs of adjacent pairs of points. Thus as will be described in detail the combination of generating a record of pairs of classifications identifying adjacent gaze locations and adjusting gaze co-ordinates using the recorded information, enables relative gaze locations for the classifications to be determined.

Figure 11:
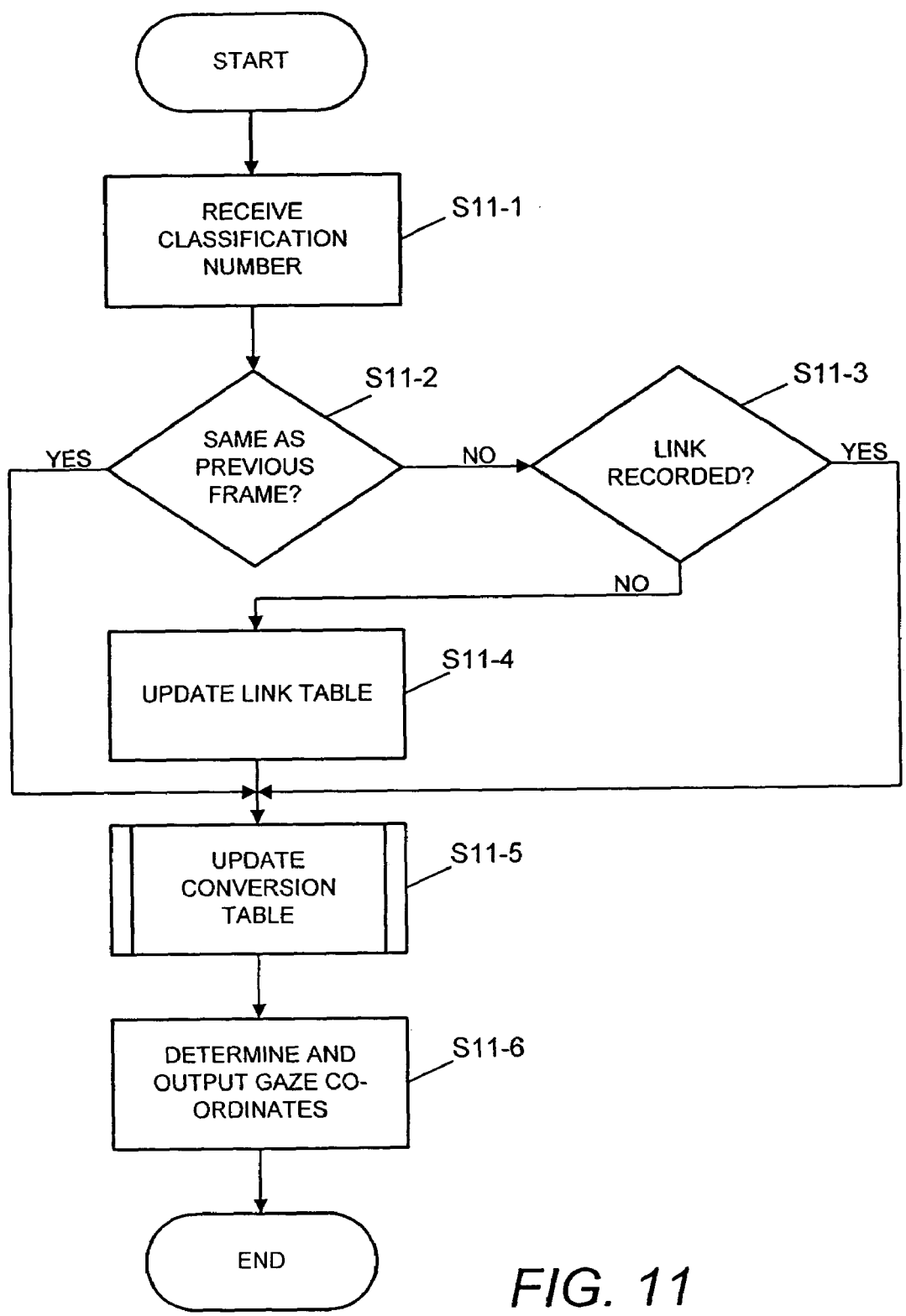
FIG. 11 is a flow diagram of the processing operations performed by the calibration unit of FIG. 2.

The processing of the calibration unit 22 will now be described in detail referring to FIG. 11.

Initially (S11-1) the calibration unit 22 receives for a frame a classification number identifying the particular table in the table store 44 to which a generated table for that image frame has been matched.

The calibration unit 22 then (S11-2) proceeds to compare this classification number with the classification number received for the previous image frame to determine whether the classification number corresponds to the classification number for the previous frame.

If this is not the case the calibration unit 22 then (S11-3) determines whether the classification number for the current frame and the classification number for the previous frame have been recorded as consecutive classifications in the link table 49. If this is not the case the calibration unit 22 then (S11-4) adds to the data stored in the link table 49 data identifying these two classifications.

Thus, for example, if the calibration unit 22 were to receive the following sequence of six classification numbers from the classification unit 20:

50, 2, 50, 1, 3, 50, . . .

when the second image frame was identified as being classified as a type 2, data identifying the combinations 50-2 and 2-50 would be stored in the link table 49. When the third frame was classified as a type 50 because data for the pair of classification 50-2 and 2-50 will have already been stored in the link table 49 no further action is taken. When the fourth frame is identified as being classified as type 1, because the previous frame was classified as type 50 data identifying the pairs 1-50 and 50-1 are stored in the link table 49.

Thus after processing the sixth frame of the above sequence, data identifying the following pairs would be stored within the link table 49:

1-3, 3-1, 1-50, 2-50, 3-50, 50-1, 50-2, 50-3.

The link table 49 generated in this way thereby indicates which pairs of classifications have been found as classifications for consecutive image frames for images received from the camera 8 and hence correspond to adjacent gaze locations.

By processing the received classification numbers in this way, the link table 49 is caused to generate a record identifying for each classification number, which classification numbers identify adjacent areas. The calibration unit 22 therefore builds up a record similar to the table referred to above in relation to the simple example illustrated by FIGS. 10A–D.

After either the link table 49 has been updated (S11-4) or after it has been determined that either the classification number received for an image frame corresponds to the same classification number for the previous image frame (S11-2) or it has been determined that data identifying the current frame classification and previous frame classification as being consecutive classifications has already been stored in the link table (S11-3) the co-ordinate update unit 50 then utilises the data stored in the link table 49 to update (S11-5) data stored in the conversion table 48.

Figure 12:
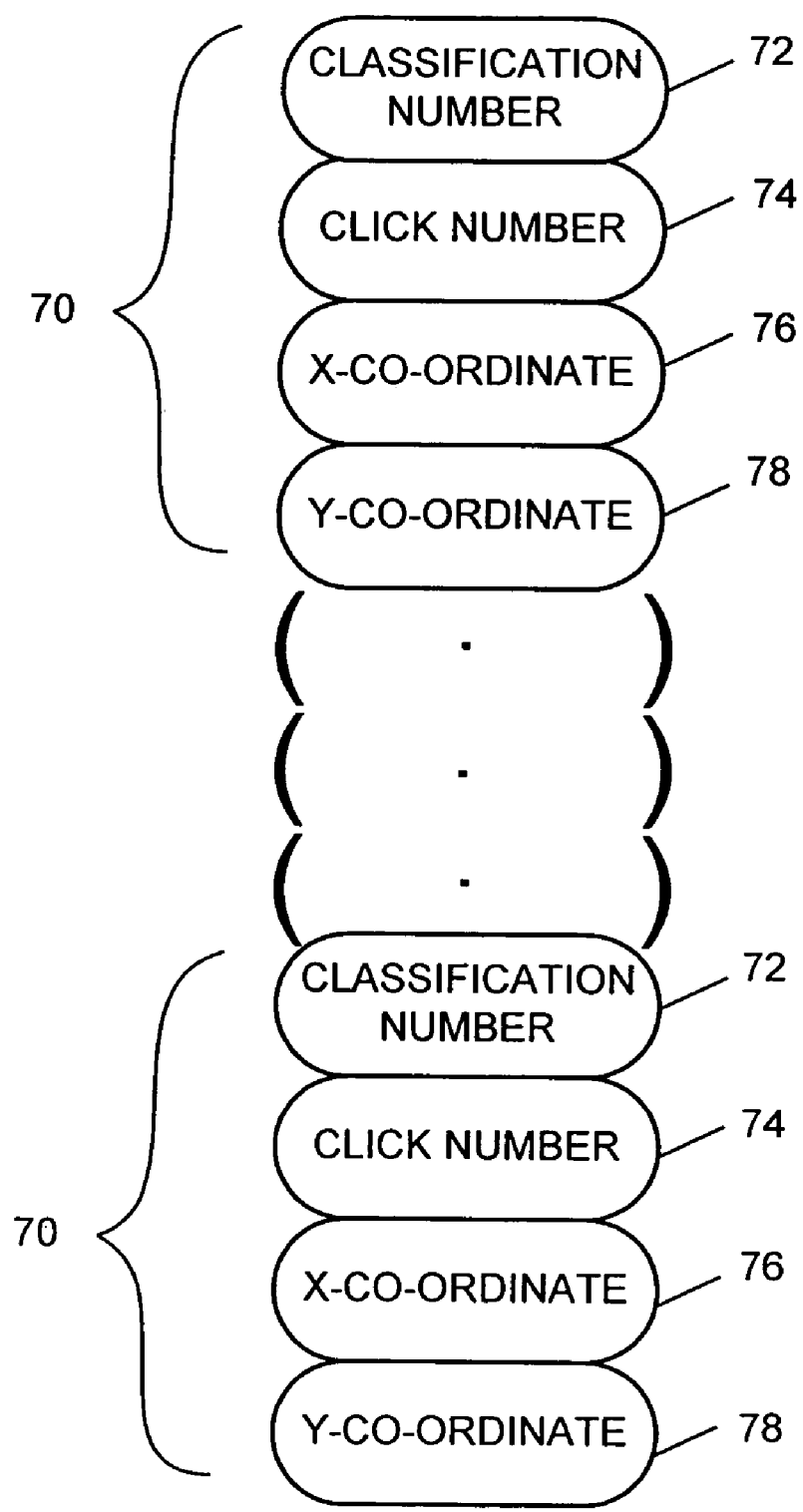
FIG. 12 is a schematic illustration of data stored in the conversion table of FIG. 2.

An exemplary data structure of data stored in the conversion table 48 in this embodiment of the present invention is illustrated in FIG. 12. In this embodiment the conversion table 48 comprises 50 conversion records 70, being one conversion record 70 for each of the tables stored in the array of tables in the table store 44. The conversion records 70 each comprise: a classification number 72 corresponding to a classification number identifying a table in the table store 44, a click number 74 which is initially set to 0, and an X co-ordinate 76 and a Y co-ordinate 78 which together identify a gaze position on or in the vicinity of the screen of display device 3. In this embodiment, the X co-ordinate data 76 and Y co-ordinate data 78 are initially set to random values.

The updating of data in the conversion table 48 by the co-ordinate update unit 50 will now be described in detail with reference to FIG. 13.

Figure 13:
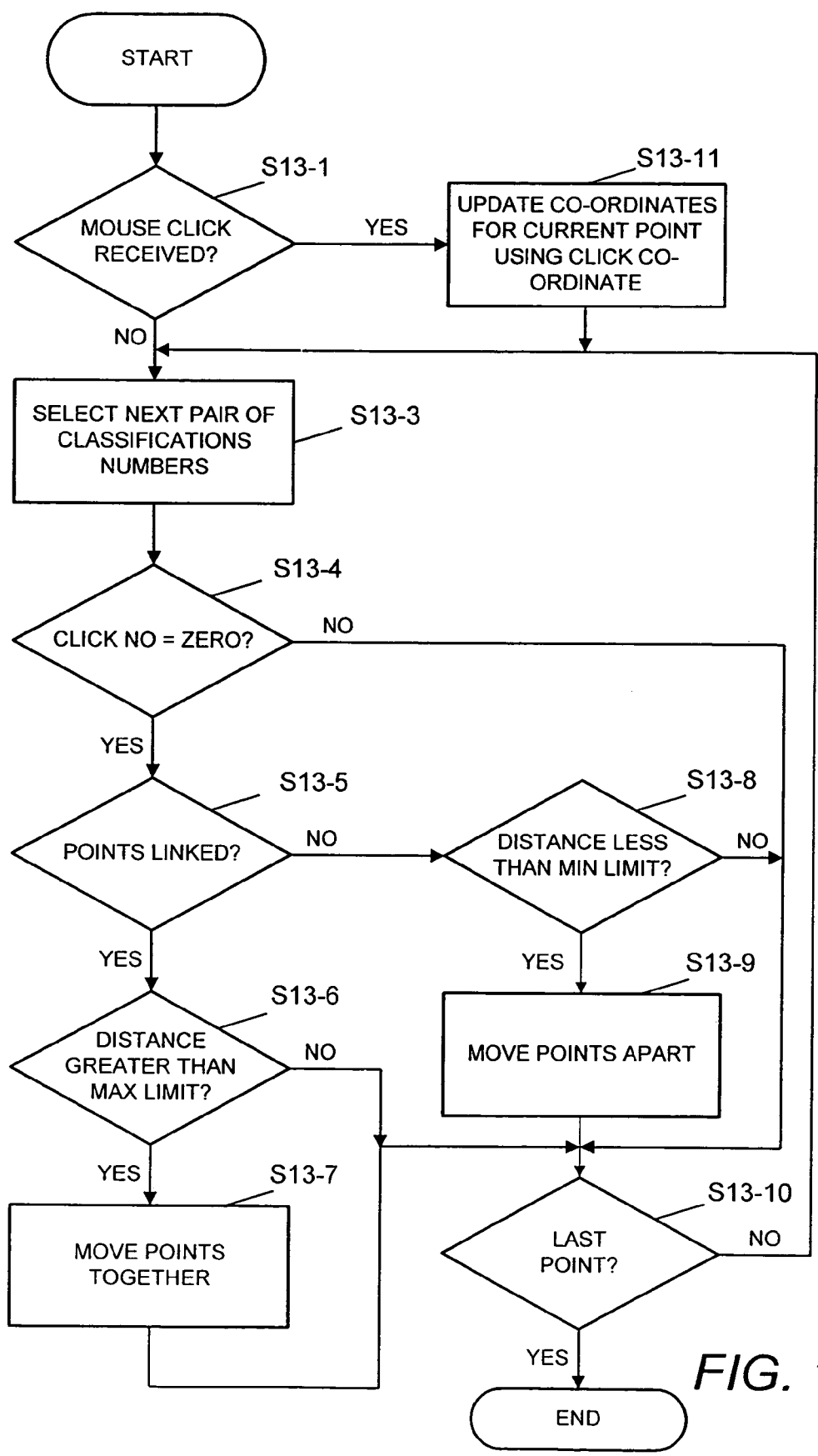
FIG. 13 is a flow diagram of the processing operations performed by the co-ordinate update unit of FIG. 2 for updating data stored in the conversion table of FIG. 2.

Referring to FIG. 13, when the table 48 is to be updated, the co-ordinate update unit 50 first (S13-1) determines whether, in the period represented by the image frame being processed, the user clicked on the mouse button of the mouse 7.

If this is the case, it may be assumed that the operator 9 was looking at the pointer 11 under the control of the mouse 7 at the time represented by the frame and the mouse click co-ordinates can therefore be used to fix a an absolute gaze location as will be described later.

If it is determined (S13-1) that no mouse click is associated with a particular frame, the co-ordinate update unit 50 then (S13-3) selects a first pair of classifications numbers for processing, for example the classification numbers 1 and 2.

The co-ordinate update unit 50 then (S13-4) determines whether the click number data 74 of the conversion record 70 identified by classification data 72 corresponding to the first number in the pair of numbers being processed is equal to 0. This will be the case, when no mouse clicks have been associated with a frame classified as corresponding to that particular classification number 72. If the click number data 74 of the conversion record 70 is not equal to 0, the co-ordinate data 76, 78 for the conversion record 70 for that classification number 72 will have been fixed utilising mouse click co-ordinates as will be described later and is not updated utilising data within the link table 49.

If the click number data 74 for the conversion record 70 is determined to be equal to 0 the co-ordinate update unit 50 then (S13-5) compares the pair of classification numbers being processed with the pairs of numbers identified by data in the link table 49.

If the pair of numbers being processed correspond to data in the link table 49, the co-ordinate update unit 50 then (S13-6) compares the x co-ordinates and y co-ordinates 76, 78 of the conversion record 70 for the first number with the x co-ordinates and y co-ordinates 76, 78 of the conversion record 70 of the second number of the pair of numbers being processed.

If the distance between the points identified by the x co-ordinates and y co-ordinates 76, 78 of the conversion records 70 identify points further apart than a pre-set threshold, (in this embodiment set to correspond to the distance of a tenth of the width of the screen of the display 3) the calibration unit 22 then (S13-7) proceeds to update the x co-ordinate data 76 and y co-ordinate data 78 of the conversion record 70 associated with the first number of the pair of numbers being processed so as to move the point associated with the first number nearer to the point associated with the search number.

The updating of the x co-ordinate data 76 and y co-ordinate data 78 of the conversion record 70 associated with the first number of the pair of numbers being processed is achieved utilising the following equations $$x_{new} = x_1 - \frac{1}{2}(x_1 - x_2)$$

$$y_{new} = y_1 - \frac{1}{2}(y_1 - y_2)$$

where $x_{new}$ is the new value for the x co-ordinate data 76 of the conversion record 70 identified by the first number of the pair of numbers being processed; $y_{new}$ is the new value of the y co-ordinate data 76 of the conversion record 70 identified by the first number of the pair of numbers being processed; and $x_1$ and $y_1$ and $x_2$ and $y_2$ are the x co-ordinates 76, 78 of the conversion records 70 identified by the first and second numbers of the pair of numbers being processed respectively.

If the calibration unit 22 determines that the pair of numbers being processed do not correspond to data within the link table 49 (S13-5) the co-ordinate update unit 50 then (S13-8) determines whether the distance between the points represented by the x co-ordinates and y coordinates 76, 78 of the conversion records 70 identified by the pair of numbers 72 being processed are less than a second preset distance apart. In this embodiment this second threshold distance is also set to be equal to the distance corresponding to a tenth of the width of the screen of the display 3.

If the distance between the points identified by the x co-ordinates 76 and y co-ordinates 78 of the two conversion records 70 is determined to be less than this preset threshold distance, the x co-ordinate data 76 and y co-ordinate data 78 of the conversion record 70 identified by the first classification number 72 of the pair of numbers being processed is then updated in order to move the point associated with the first number away from the point associated with the second number utilising the following equations:

$$x_{new} = x_1 + \frac{1}{2}(x_1 - x_2)$$

$$y_{new} = y_1 + \frac{1}{2}(y_1 - y_2)$$

where $x_{new}$ is the new value for the x co-ordinate data 76 of the conversion record 70 identified by the first number of the pair of numbers being processed; $y_{new}$ is the new value of the y co-ordinate data 76 of the conversion record 70 identified by the first number of the pair of numbers being processed and $x_1$ and $y_1$ and $x_2$ and $y_2$ are the x co-ordinates and y co-ordinates 76, 78 of the conversion records 70, identified by first and second numbers of the pair of numbers being processed respectively.

Either after the x co-ordinate data 76 and y co-ordinate data 78 for the conversion record 70 associated with the first number of the pair of numbers has been updated (S13-7, S13-9) or it has been determined that such an update is not necessary (S13-4, S13-6, S13-8), the calibration unit 22 then determines whether all possible pairs of classification numbers have been processed (S13-10). If this is not the case, the next pair of classification numbers are selected and processed in the same way as has been described above (S13-3-S13-10).

Thus in a similar way to that illustrated by the simple example of FIGS. 10A–10D, the co-ordinates associated with classification numbers identifying adjacent areas are made to move closer together and the co-ordinates associated with classification numbers identifying non adjacent areas are moved further apart.

The effect of repeatedly updating the conversion records 70 in the manner described above is to utilise the data stored in the link table 49 to cause co-ordinate data 76, 78 for conversion records 70 for classification numbers 72 assigned to consecutive images to identify points close together and to cause co-ordinate data 76, 78 for conversion records 70 for classification numbers not assigned to consecutive images to identify points further apart. As discussed above, this results in the relative positions identified by the co-ordinate data 76, 78 of the conversion records 70 to identify locations indicative of an operator's gaze, positioned correctly relative to each other (but possibly being a reflection, rotation or translation or a combination of a reflection, rotation or translation of absolute gaze co-ordinates at this stage).

The determination of gaze locations in this way is generally satisfactory. However, the gaze locations generated are limited by the fact that the positions assigned to different classifications are correct only relative to one another. That is to say the identified positions do not identify absolute locations in space but locations relative to one another.

In order to overcome this limitation, in addition to determining relative locations of gaze from the classification numbers assigned to consecutive images, in this embodiment, the calibration unit 22 is also arranged to utilise mouse click data to assign absolute co-ordinate data to classification records 70. Once the absolute position of one classification record 70 has been fixed, any relative gaze co-ordinates determined relative to that fixed point will be correct subject to being a reflection or rotation of the absolute position or by being both reflected and rotated relative to the fixed point. When the absolute locations of three non colinear gaze locations has been determined, relative gaze co-ordinates relative to these fixed positions will correspond to absolute gaze locations.

Referring to FIG. 13, in this embodiment, whenever an image frame is determined to be associated with a mouse click (S13-1), the calibration unit 22 first (S13-11) proceeds to utilise the click co-ordinates to update the gaze co-ordinates 76, 78 for the conversion record 70 containing the classification number 72 corresponding to the classification number assigned to the image frame being processed.

Specifically, the calibration unit 22 proceeds to update the conversion record 70 identified by the classification number 72 for the current frame by incrementing the click number 74 of that record 70 by 1 and then updating the X co-ordinate data 76 and Y co-ordinate data 78 of the record 70 utilising the following equations:

$$X_{new} = \frac{X_{click}}{\text{click no.}} + \left(1 - \frac{1}{\text{click no.}}\right)X_{old} \text{ and}$$

$$Y_{new} = \frac{Y_{click}}{\text{click no.}} + \left(1 - \frac{1}{\text{click no.}}\right)Y_{old}$$

where $x_{new}$ is the updated x co-ordinate data 76; $x_{old}$ is the previous value of the x co-ordinate data 76; $x_{click}$ is the x co-ordinate for the pointer when the mouse button was clicked; $y_{new}$ is the updated y co-ordinate data 78; $y_{old}$ is the previous value of the y co-ordinate data 78 $y_{click}$ is the y co-ordinate for the pointer when the mouse button was clicked; and click no. is the click number data 74 for the conversion record 70 being updated.

Thus, if previously no mouse clicks have been associated with frames classified to a particular classification number 72 then the x co-ordinate and y co-ordinate data 76, 78 for the conversion record 70 having that classification number 72 is updated so that the x co-ordinate data 76 and y co-ordinate date 78 correspond to the x and y co-ordinates respectively for the position identified by the pointer 11 when the mouse 7 was clicked. If more than one frame classified utilising the same classification number is associated with a mouse click, the x co-ordinate data 76 and y co-ordinate data 78 for the conversion record 70 identified by that classification number 72 are updated so that the x co-ordinate data and y co-ordinate data 76, 78 each correspond to an average value for the x co-ordinates and y co-ordinates of positions pointed to by the pointer 11 when the mouse 7 was clicked and obtained images were assigned to that classification.

Once the co-ordinate data for the conversion record 70 including the classification number for the current frame has been updated (S13-11). The calibration unit 22 then proceeds to update co-ordinate data for the remaining records in the manner which has previously been described (Sl3-3-S13-10).

Finally, returning to FIG. 11, after the conversion table 48 has been updated (S11-5) the calibration unit 22 then outputs as gaze co-ordinates for a particular image frame the x co-ordinate data 76 and y co-ordinate data 78 of the conversion record 70 having the classification number 72 corresponding to the classification number for the image frame being processed.

These gaze co-ordinates are output to the application program 23 which then utilizes the co-ordinates to modify the functioning of the application program 23 for example by amending the animation of a virtual representation of the operator 9. As soon as a pair of gaze co-ordinates for an image frame have been passed to the application program 23, the calibration unit 22 then proceeds to process the next classification number output by the classification unit 20 for the next image frame.

Further Modifications and Embodiments

In the above described embodiment, an image of an operator 9 obtained by a camera 8 is described as being processed to associate pixels in the images with sets of three image patches. It will be appreciated that instead of generating image patches from three different sizes of image area, a lesser or greater number of image patches could be generated so that features present at a lesser or greater number scales could be detected.

Further in addition or instead of processing images to obtain image patches which are substantially independent of lighting variations and movement towards and away from the camera 8, other forms of image processing could be undertaken to account for other distortions arising from the motion of an operator. Thus for example image patches could be processed to account for rotations or affine distortions of portions of an image.

Although in the above described embodiment, an image of an operator comprising an array of 176×144 pixels is described as being processed, it will be appreciated that certain portions of an image convey more information about the gaze of an operator 9 than others. Thus for example, a higher resolution image of the portion of an operator 9 corresponding to the operator's eyes could be obtained and utilised to obtain an improved resolution of gaze tracking.

Although in the above described embodiment, the processing of images is described in relation to tracking an operator's gaze, it will be appreciated that the two stage process of removing lighting effects subject to a scaling factor and then comparing values in a manner which is unaffected by that scaling factor could be utilised to identify colour features in any form of image processing system where identification of colour features is desirable. Thus for example, extraction and matching of features as described could be utilised for, for example, pattern recognition.

In the above described embodiment, absolute gaze locations for some frames are determined utilising mouse click data identify portions of a screen of a display 3 selected using the mouse 7 where the frames were obtained. It will be appreciated that alternative systems could be utilised to obtain absolute gaze locations for some image frames. Thus for example, after a certain number of frames had been processed and the data stored by the self-organising maps 24, 26 had substantially become fixed, the operator 9 could be prompted by the screen display to look at specific portions on the screen. The classification numbers of image frames when the user was looking at those known portions on the screen could then be utilised to fix the absolute gaze locations identified by those classifications.

Alternatively instead of utilising mouse click data, the stream of classification numbers output by the classification unit 20 alone could be used to estimate absolute gaze locations. In such an alternative embodiment, the relative gaze locations represented by different classifications could be calculated the same way as is described in detail in the above embodiment. The calibration unit 22 could then also be arranged to store the number of times each type of classification was encountered. The frequencies which different classifications were encountered could then be compared with stored data so that where for example for a particular application a user is known to look at the top left hand corner of the screen more often than the bottom right hand corner, the frequency with which particular gaze locations are identified by the calibration unit 22 could be checked and the relative gaze locations rotated or reflected as appropriate so that the frequency for different points on the screen corresponds to the expected frequency with which the positions are encountered.

Although in the above described embodiment the determination of relative gaze positions and the fixing of absolute gaze positions utilising mouse click data is achieved at the same time, it will be appreciated that the determination of relative gaze positions and absolute gaze positions could be achieved consecutively.

Thus for example, in one alternative embodiment, the calibration unit 22 could be arranged to obtain mouse click data for three or more frames and delay determining relative gaze locations for classifications until the absolute locations for three or more classifications had been fixed using the mouse click data. After these absolute gaze locations had been fixed, relative gaze locations for the remaining classification could then be determined.

Alternatively, relative gaze locations could first be determined and later absolute gaze positions data for a number of classifications could be obtained so that the transformation of the calculated relative gaze locations to absolute gaze locations could then be determined and then applied to the previously generated relative gaze locations.

Although in the above described embodiment, an application program 23 for animating virtual representations of the operator has been described, it will be appreciated that the gaze tracking system described could be utilised to provide an input to any type of application program 23 so that the users gaze could be taken as an input to the program and the processing of the program amended accordingly. Thus for example an application program 23 might utilise the calculated position of the users gaze to control the location of a cursor or for selecting icons.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. Apparatus for associating gaze data representative of the location of gaze of an operator with classifications of images of an operator looking at different locations, comprising:
a receiver operable to receive a video stream defining a sequence of images representative of an operator at different points in time;
a classification unit operable to assign one of a number of classifications to images in the video stream received by said receiver, said classification unit being operable to assign the same classifications to images of an operator looking at the same locations; and
a calibration unit comprising:
a classification store configured to store data identifying the pairs of different classifications assigned to pairs of images in a video stream received by said receiver representative of an operator at different times separated by less than a preset time period;
a gaze conversion store configured to store data associating each of said number of classifications with gaze data representative of a gaze location; and
an update unit operable to update gaze data stored in said gaze conversion store by updating said gaze data such that gaze data for pairs of different classifications identified by data stored in said classification store identify gaze locations which are closer together and gaze data for pairs of different classifications not identified by data stored in said classification store identify gaze locations which are further apart.

2. Apparatus in accordance with claim 1 wherein said calibration unit is responsive to the assignment of different classifications to images representative of an operator at different times separated by less than said pre set time period by said classification unit to determine whether data stored in said classification store is indicative of said pair of classifications and to update data stored in said classification store in dependence upon said determination.

3. Apparatus in accordance with claim 2 wherein said classification unit is operable to determine whether classifications assigned to consecutive images in a video stream received by said receiver are assigned to different classifications and to update data identifying pairs of classifications stored in said classification store if the different classifications for a pair of consecutive images are not identified by data in said classification store.

4. Apparatus in accordance with any claim 1 wherein said update unit is operable to determine the distance between locations identified by gaze data associated with pairs of classifications, said update unit being operable to update gaze data on the basis of said determined distances and said data stored in said classification store.

5. Apparatus in accordance with claim 4 wherein said update unit is operable to adjust gaze data associated with classifications identified by data in said classification store when the determined distance between the gaze locations identified by gaze data for said pair of classifications is greater than a predetermined threshold.

6. Apparatus in accordance with claim 4 wherein said update unit is operable to adjust gaze data associated with classifications not identified by data in said classification store when the determined distance between the gaze locations identified by gaze data for said pair of classifications is less than a predetermined threshold.

7. Apparatus in accordance with claim 1 wherein said gaze data comprises a co-ordinate data, said update unit being operable to update gaze data for classifications by adjusting said co-ordinate data by an amount determined utilising the difference between the coordinates associated with selected pairs of classifications.

8. Apparatus in accordance with claim 7 wherein said update unit us operable to adjust gaze data associated with a pair of classifications identified by data in said classification store when the distance between the locations identified by said gaze data is more than a predetermined threshold by adjusting the gaze data for at least one of said pair of classifications utilising the following equation:

$$\overline{P}_{update} = \overline{P}_{old} - \frac{1}{\sigma}(\overline{P}_{other} - \overline{P}_{old})$$

where
$\overline{P}_{update}$ is a vector representing the updated gaze data
$\overline{P}_{old}$ is a vector representing the data being updated
$\overline{P}_{other}$ is a vector representing the gaze location data of the other point in the pair of classifications
and $\sigma$ is a predetermined value.

9. Apparatus in accordance with claim 7 wherein said update unit is operable to adjust gaze data associated with a pair of classifications not identified by data in said classification store, when the distance between the locations identified by said gaze data is less than a predetermined threshold by adjusting the gaze data for at least one of said pair of classifications utilising the following equation:

$$\overline{P}_{update} = \overline{P}_{old} + \frac{1}{\sigma}(\overline{P}_{other} - \overline{P}_{old})$$

where
$\overline{P}_{update}$ is a vector representing the updated gaze data
$\overline{P}_{old}$ is a vector representing the data being updated
$\overline{P}_{other}$ is a vector representing the gaze location data of the other point in the pair of classifications
and $\sigma$ is a predetermined value.

10. Apparatus in accordance with claim 1 further comprising:
a display operable to display a user interface including a pointer;
a control device operable to control the location of said pointer on said display, said control device being operable to enable a user to select portions of said display utilising said pointer; and
a monitoring unit operable to monitor the selection of portions of said display utilising said control device, and to update gaze data associated with the classification of an image an operator obtained when a selection of a portion of the display is made using the control device utilising data identifying the location of the portion of the display selected.

11. Apparatus in accordance with the claim 10 wherein said control device comprises a mouse, said selection of a portion of the display being initiated by clicking a button on said mouse.

12. Apparatus in accordance with claim 1 further comprising:

a display operable to display a plurality of user interfaces identifying particular portions of said display, wherein said calibration unit is operable to associate classifications of images obtained when a user interface identifying a particular portion of the display is shown with gaze data identifying the location of the portion of said display identified by said user interface.

13. Apparatus in accordance with claim 1 further comprising a data store operable to store data identifying the frequency with which images are associated with each of said classifications, said calibration unit being operable to update gaze data stored in said second data store by applying a selected transformation to said gaze data on the basis of said data stored in said data store.

14. Apparatus in accordance with claim 12 wherein said selected transformation comprises a transformation defining a reflection, a rotation, a translation or a combination of a reflection, rotation and a translation.

15. Apparatus in accordance with claim 1 wherein said classification unit comprises a self-organising map.

16. Apparatus in accordance with claim 1 further comprising an output unit operable to output for a video stream received by said receiver a sequence of gaze data comprising gaze data associated by said gaze conversion store with the classifications assigned to each image in said video stream by said classification unit.

17. A method associating gaze data representative of the location of gaze of an operator with classifications of images of an operator looking at different locations, comprising:
receiving a video stream defining a sequence of images representative of an operator at different points in time;
assigning one of a number of classifications to images in the received video stream, wherein the same classifications are assigned to images of an operator looking at the same locations;
storing data identifying the pairs of different classifications assigned to pairs of images in a received video stream representative of an operator at different times separated by less than a preset time period;
storing data associating each of said number of classifications with gaze data representative of a gaze location; and
updating stored gaze data by updating said gaze data such that gaze data for pairs of different classifications identified by stored data said gaze data identifies gaze locations which are closer together and gaze data for pairs of different classifications not identified by stored data are updated to identify gaze locations which are further apart.

18. A method in accordance with claim 17 further comprising responding to the assignment of different classifications to images representative of an operator at different times separated by less than said pre set time period by determining whether stored data identifies said pair of classifications and updating said stored data in dependence upon said determination.

19. A method in accordance with claim 18 wherein said determination comprises determining whether classifications assigned to consecutive images in a received video stream are assigned to different classifications and updating said stored data comprises storing data identifying the pair of different classifications if the different classifications for a pair of consecutive images are not already identified by stored data.

20. A method in accordance with claim 17 wherein said updating stored gazed data comprises determining the distance between locations identified by gaze data associated with pairs of classifications, and updating gaze data on the basis of said determined distances and said stored data.

21. A method in accordance with claim 20 wherein said updating stored gaze data comprises adjusting gaze data associated with classifications identified by stored data when the determined distance between the gaze locations identified by gaze data for said pair of classifications is greater than a predetermined threshold.

22. A method in accordance with claim 20 wherein said updating stored gaze data comprises adjusting gaze data associated with classifications not identified by stored data when the determined distance between the gaze locations identified by gaze data for said pair of classifications is less than a predetermined threshold.

23. A method in accordance with claim 17 wherein said gaze data comprises a co-ordinate data and said updating stored gaze data comprises updating gaze data for classifications by adjusting said co-ordinate data by an amount determined utilising the difference between the co-ordinates associated with selected pairs of classifications.

24. A method in accordance with claim 23 wherein said updating stored gaze data comprises adjusting gaze data associated with a pair of classifications identified by stored data when the distance between the locations identified by said gaze data is more than a predetermined threshold by adjusting the gaze data for at least one of said pair of classifications utilising the following equation:

$$\overline{P}_{update} = \overline{P}_{old} - \frac{1}{\sigma}(\overline{P}_{other} - \overline{P}_{old})$$

where
$\overline{P}_{update}$ is a vector representing the updated gaze data
$\overline{P}_{old}$ is a vector representing the data being updated
$\overline{P}_{other}$ is a vector representing the gaze location data
of the other point in the pair of classifications
and $\sigma$ is a predetermined value.

25. A method in accordance with claim 23 wherein said updating stored gaze data comprises adjusting gaze data associated with a pair of classifications not identified by stored data when the distance between the locations identified by said gaze data is less than a predetermined threshold by adjusting the gaze data for at least one of said pair of classifications utilising the following equation:

$$\overline{P}_{update} = \overline{P}_{old} + \frac{1}{\sigma}(\overline{P}_{other} - \overline{P}_{old})$$

where
$\overline{P}_{update}$ is a vector representing the updated gaze data
$\overline{P}_{old}$ is a vector representing the data being updated
$\overline{P}_{other}$ is a vector representing the gaze location data
of the other point in the pair of classifications
and $\sigma$ is a predetermined value.

26. A method in accordance with claim 17 further comprising the steps of:
displaying a user interface including a pointer;
a monitoring user input to identify the selection of portions of said user interface utilising said pointer under the control of a control device, and updating stored gaze data associated with the classification of an image an operator obtained when a selection of a portion of the user interface is determined to have been made utilising data identifying the location of the portion of the user interface selected with said pointer.

27. A method in accordance with the claim 26 wherein said control device comprises a mouse, said selection of a portion of the display being initiated by clicking a button on said mouse.

28. A method in accordance with claim 17 further comprising the steps of:
   displaying a plurality of user interfaces identifying particular portions of a display; and
   associating classifications of images obtained when a user interface identifying a particular portion of the display is shown with gaze data identifying the location of the portion of said display identified by said user interface.

29. A method in accordance with claim 17 further comprising the steps of:
   storing data identifying the frequency with which images are associated with each of said classifications; and
   updating gaze data by applying a selected transformation to said gaze data on the basis of said data identifying the frequency with which images are associated with each of said classifications.

30. A method in accordance with claim 29 wherein said selected transformation comprises a transformation defining a reflection, a rotation, a translation or a combination of a reflection, rotation and a translation.

31. A method in accordance with claim 17 further comprising the steps of:
   outputting for a received video stream a sequence of gaze data comprising gaze data associated with the classifications assigned to each image in said video stream.

32. A data carrier storing computer implementable process steps for causing a programmable computer to perform a method in accordance with claim 17.

33. A data carrier in accordance with claim 32 comprising a computer disc.

34. A computer disc in accordance with claim 33 wherein said computer disc comprises an optical, magneto-optical or magnetic disc.

35. A data carrier in accordance with claim 32 comprising an electric signal transferred via a network.

36. Apparatus for associating data indicative of the orientation of a person's head with classifications of images of a person's head comprising:
   a receiver operable to receive a video stream defining a sequence of images of a person's head;
   a classification unit operable to assign one of a number of classifications to images in the video stream received by said receiver, said classification unit being operable to assign the same classifications to images of a person's head in substantially the same orientations; and
   a calibration unit comprising:
   a classification store configured to store data identifying pairs of different classifications assigned to pairs of images in a video stream received by said receiver representative of a person's head at different times separated by less than a reference time period;
   a conversion store configured to store data associating each of said number of classifications with data representative of at least one head orientation; and
   an update unit operable to update data stored in said conversion store by updating said data such that data for pairs of different classifications identified by data stored in said classification store identify head orientations which are closer together and data for pairs of different classifications not identified by data stored in said classification store identify head orientations which are further apart.

37. A method of associating data indicative of the orientation of a person's head with classifications of images of a person's head comprising:
   receiving a video stream defining a sequence of images of a person's head;
   assigning one of a number of classifications to images in the received video stream, wherein the same classifications are assigned to images of a person's head in substantially similar orientations;
   storing pair data identifying pairs of different classifications assigned to pairs of images in a received video stream representative of a person's head at different times separated by less than a reference time period;
   storing association data associating each of said number of classifications with data representative of at least one head orientation; and
   updating said association data such that association data for pairs of different classifications identified by stored pair data identify head orientations which are closer together and association data for pairs of different classifications not identified by stored pair data identify head orientations which are further apart.

38. Apparatus for associating data indicative of the viewing direction of a person's eyes with classifications of images of a person's eyes comprising:
   a receiver operable to receive a video stream defining a sequence of images of a person's eyes;
   a classification unit operable to assign one of a number of classifications to images in the video stream received by said receiver, said classification unit being operable to assign the same classifications to images of a person's eyes in substantially the same viewing directions; and
   a calibration unit comprising:
   a classification store configured to store data identifying pairs of different classifications assigned to pairs of images in a video stream received by said receiver representative of a person's eyes at different times separated by less than a reference time period;
   a conversion store configured to store data associating each of said number of classifications with data representative of at least one viewing direction; and
   an update unit operable to update data stored in said conversion store by updating said data such that data for pairs of different classifications identified by data stored in said classification store identify viewing directions which are closer together and data for pairs of different classifications not identified by data stored in said classification store identify viewing directions which are further apart.

39. A method of associating data indicative of the viewing directions of a person's eyes with classifications of images of a person's eyes comprising:
   receiving a video stream defining a sequence of images of a person's eyes;
   assigning one of a number of classifications to images in the received video stream, wherein the same classifications are assigned to images of a person's eyes in substantially similar viewing directions;
   storing pair data identifying pairs of different classifications assigned to pairs of images in a received video stream representative of a person's eyes at different times separated by less than a reference time period;

storing association data associating each of said number of classifications with data representative of at least one viewing direction; and updating said association data such that association data for pairs of different classifications identified by stored pair data identify viewing directions which are closer together and association data for pairs of different classifications not identified by stored pair data identify viewing directions which are further apart.

* * * * *

UNITED STATES PATENT AND TRADEMARK OFFICE
CERTIFICATE OF CORRECTION

PATENT NO. : 7,158,097 B2
APPLICATION NO. : 10/681230
DATED : January 2, 2007
INVENTOR(S) : Richard Ian Taylor et al.

It is certified that error appears in the above-identified patent and that said Letters Patent is hereby corrected as shown below:

In the Drawings
SHEET 2:

FIG. 2, "ORGANISING" (both occurrences) should read --ORGANIZING-- and "SATION" should read --ZATION--.

SHEET 6:

FIG. 6, "NORMALISE" should read --NORMALIZE--.

SHEET 7:

FIG. 7, "SELF-ORGANISING" should read --SELF-ORGANIZING--.

COLUMN 1:

Line 10, "operators" should read --operator's--.
Line 63, "updated" should read --update--.

COLUMN 2:

Line 24, "data said" should read --data of said--.

COLUMN 4:

Line 31, "operators" should read --operator's--.
Line 32, "users" should read --user's--.

COLUMN 11:

Line 36, "operators" should read --operator's--.

COLUMN 16:

Line 2, "$\theta_o$, T, $\theta_{oo}$, $\rho_o$ and $\rho_{oo}$" should read --$\eta_o$, T, $\eta_{oo}$, $\sigma_o$ and $\sigma_{oo}$--.
Line 6, "$\theta_o=0.1$, T=10,000, $\theta_{oo}=0.001$" should read --$\eta_o=0.1$, T=10,000, $\eta_{oo}=0.001$--.

UNITED STATES PATENT AND TRADEMARK OFFICE
CERTIFICATE OF CORRECTION

| | | |
|---|---|---|
| PATENT NO. | : 7,158,097 B2 | |
| APPLICATION NO. | : 10/681230 | |
| DATED | : January 2, 2007 | |
| INVENTOR(S) | : Richard Ian Taylor et al. | |

It is certified that error appears in the above-identified patent and that said Letters Patent is hereby corrected as shown below:

<u>COLUMN 17</u>:

Line 2, "until of" should read --until all of--.

<u>COLUMN 28</u>:

Line 10, "us" should read --is--.
Line 15, "utilising" should read --utilizing--.
Line 22, "data" should read --data,--.
Line 23, "updated" should read --updated,--.
Line 25, "classifications" should read --classifications,--.
Line 33, "utilising" should read --utilizing--.
Line 41, "data" should read --data,--.
Line 42, "updated" should read --updated,--.
Line 44, "classifications" should read --classifications,--.
Line 53, "utilising" should read --utilizing--.
Line 55, "utilising" should read --utilizing--.
Line 59, "utilising" should read --utilizing--.

<u>COLUMN 29</u>:

Line 20, "self-organising" should read --self-organizing--.
Line 45, "data said" should read --data of said--.

<u>COLUMN 30</u>:

Line 19, "determined utilising" should read --determined by utilizing--.
Line 27, "utilising" should read --utilizing--.
Line 34, "data" should read --data,--.
Line 35, "updated" should read --updated,--.
Line 37, "classifications" should read --classifications,--.
Line 45, "utilising" should read --utilizing--.
Line 53, "data" should read --data,--.
Line 54, "updated" should read --updated,--.
Line 56, "classifications" should read --classifications,--.
Line 60, "pointer;" should read --pointer; and--.
Line 61, "a" should be deleted.
Line 62, "utilising" should read --utilizing--.

UNITED STATES PATENT AND TRADEMARK OFFICE
CERTIFICATE OF CORRECTION

PATENT NO. : 7,158,097 B2
APPLICATION NO. : 10/681230
DATED : January 2, 2007
INVENTOR(S) : Richard Ian Taylor et al.

It is certified that error appears in the above-identified patent and that said Letters Patent is hereby corrected as shown below:

<u>COLUMN 31</u>:

Line 1, "utilising" should read --utilizing--.
    Line 28, "steps" should read --step--.

Signed and Sealed this

Twenty-ninth Day of July, 2008

JON W. DUDAS
*Director of the United States Patent and Trademark Office*